United States Patent
Kuehnel

(10) Patent No.: US 9,730,073 B1
(45) Date of Patent: Aug. 8, 2017

(54) NETWORK CREDENTIAL PROVISIONING USING AUDIBLE COMMANDS

(71) Applicant: Amazon Tehnologies, Inc., Seattle, WA (US)

(72) Inventor: Thomas Werner Kuehnel, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 44 days.

(21) Appl. No.: 14/743,457

(22) Filed: Jun. 18, 2015

(51) Int. Cl.
*H04W 12/08* (2009.01)

(52) U.S. Cl.
CPC .................... *H04W 12/08* (2013.01)

(58) Field of Classification Search
CPC .................................................... H04W 12/08
See application file for complete search history.

(56) References Cited

U.S. PATENT DOCUMENTS

| 8,866,581 | B1 | 10/2014 | Leblang | |
| 2005/0125693 | A1* | 6/2005 | Duplessis | H04L 63/0428 726/4 |
| 2007/0239455 | A1* | 10/2007 | Groble | G10L 13/08 704/260 |
| 2008/0154599 | A1* | 6/2008 | Muschett | G10L 15/06 704/250 |
| 2013/0332158 | A1* | 12/2013 | Corfield | G10L 15/07 704/235 |
| 2016/0026639 | A1* | 1/2016 | Bell | G06F 17/276 707/749 |
| 2016/0133251 | A1* | 5/2016 | Kadirkamanathan | G06F 17/2264 704/9 |
| 2016/0258202 | A1* | 9/2016 | Scalisi | E05F 15/77 |

* cited by examiner

Primary Examiner — William Powers
(74) Attorney, Agent, or Firm — Pierce Atwood LLP

(57) ABSTRACT

Devices, methods, and systems for provisioning network credentials onto a device using audible commands. In some instances, the device is a headless device without a graphical user interface. The device may include a limited number of speech models and phrases pre-programmed onto the device to enable the device to query a user to enter network credentials and have a dialog type interface with the user using local speech recognition techniques. Once the network credentials are entered and the device connects to the user's network, the device may change modes and limit the local speech recognition techniques. In this respect, the device may send audio input to a more powerful remote device for processing.

20 Claims, 15 Drawing Sheets

NETWORK CREDENTIAL PROVISIONING USING AUDIBLE COMMANDS

BACKGROUND

Human-computer interactions have progressed to the point where humans can control computing devices, including gaming devices, and provide input to those devices, by speaking. However, as technology progresses more and more headless devices are emerging. In general, these headless devices do not include a graphical user interface or other peripheral devices. Therefore, these headless devices typically rely on out of band channel communication with another device, such as a computer, tablet, and/or smartphone to receive information from a user. For example, the user may pair a headless device with the user's smartphone. The user may then use the graphical user interface of the smartphone to set-up, transfer information to, and/or make changes in the operation of the headless device.

BRIEF DESCRIPTION OF DRAWINGS

For a more complete understanding of the present disclosure, reference is now made to the following description taken in conjunction with the accompanying drawings.

DETAILED DESCRIPTION

Figure 1:
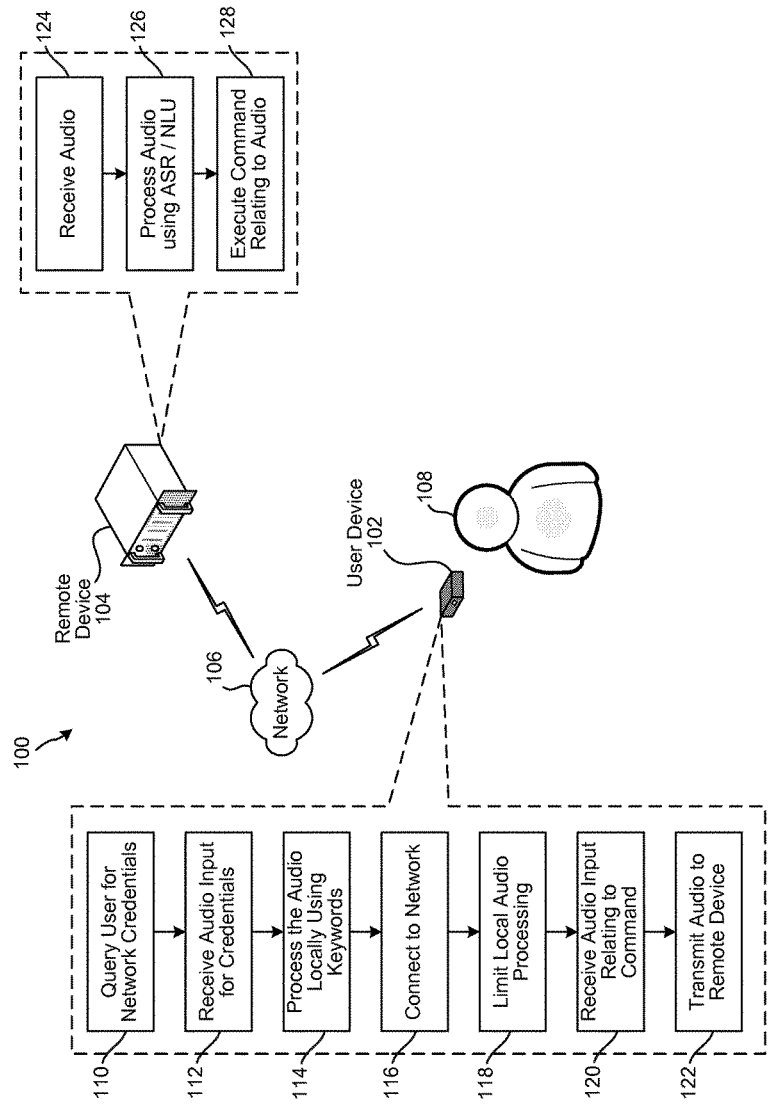
FIG. 1 illustrates an overview of a system for implementing embodiments of the present disclosure.

An increasing number of headless devices are emerging. Such headless devices may include electronic devices without traditional visual output mechanisms (i.e., without a display) as well as devices without traditional input mechanisms (i.e., without a keyboard, mouse, touchscreen, etc.) However, such headless devices typically rely on out of band channel communication with another device, such as a computer, tablet, and/or smartphone to set-up (such as set up a network connection), transfer information, receive information, and/or make changes to or from the headless device. Such coordination with another device is done typically because headless devices usually have limited computing power and lack a robust user interface for the user to interact with. Not all headless devices, however, are directly or easily compatible with all other devices, particularly when a headless device must first be connected to a password protected network, which typically requires selection of a network and entry of a password. Without traditional inputs, connecting a headless device to a password protected network can cause user frustration.

To improve the user experience and simplify set-up and operation of a user device, such as a headless device, the user device may be configured to allow a user to set-up and control the user device based on spoken commands in a dialogue type fashion. Such commands are typically a spoken word or phrase that instruct the user device to perform one or more functions, i.e., enter or select a wireless network to connect to, enter a password, etc. A command may start with a keyword, which may be one or more sounds, words and/or a phrase. When the user device detects the keyword, it may listen for a further audible command following the keyword to act upon.

Automatic speech recognition (ASR) is a field of computer science, artificial intelligence, and linguistics concerned with transforming audio data associated with speech into text representative of that speech. ASR typically uses at least an acoustic model to identify potentially detected sounds in an audio signal and a language model/grammar to identify potentially detected words and/or phrases from the potentially detected sounds. Similarly, natural language understanding (NLU) is a field of computer science, artificial intelligence, and linguistics concerned with enabling computers to derive meaning from text input containing natural language. ASR and NLU are often used together as part of a speech processing system.

However, ASR and NLU can be computationally intensive. That is, significant computing resources may be needed to process ASR and NLU processing within a reasonable time frame. Because of this, a distributed computing environment is often used when performing speech processing. A typical such distributed environment may involve a local device having one or more microphones being configured to capture sounds from a user speaking and convert those sounds into an audio signal. The audio signal may then be sent to a downstream remote device for further processing, such as converting the audio signal into an ultimate command. The command may then be executed by a combination of remote and local devices depending on the command itself.

Due to the limited computing power of headless devices, it may be impractical to perform ASR and/or NLU on the user device. Instead of using computationally intensive ASR and NLU techniques, the user device may use a keyword spotting type technique. In this respect, the user device may be pre-programmed with a limited number of keyword spotting models/audio signatures corresponding to the sounds of the respective keywords. The models may include audio signatures corresponding to letters of the alphabet (such as A-Z), numbers (such as 0-9), symbols (such as !, @, #, $, %, ˆ, &, *, (,) :, etc.), as well as certain simple commands ("capitol," "shift," or the like) or indications ("yes," "no," etc.). The models may also include pattern recognition type models to assist in determining when a portion of a spoken utterance matches one or more of the models. The models may be language and/or accent specific to a region where the user device is shipped or predicted to be located, or to the user himself/herself. For example, when it is in know that the device is going to be shipped to Paris, France, the models may be specific to the dialect of French spoken in Paris, France, etc. The models correspond to specific sounds so that a user device may perform limited recognition of the intention of spoken audio without necessarily having the capabilities of a more robust ASR system including acoustic models, language models, etc. The user device simply matches incoming audio to the models and if a match is detected, the user device determines what keyword (or letter, symbol, command) corresponds to the matched model. Such limited keyword spotting is significantly more limited than full ASR, but it is also requires significantly fewer computing resources.

Each of the separate models may correspond to different keywords. For example, a keyword "letter" may be used to signal to the device to process audio following the utterance of "letter" using the models for the letters of the alphabet. In another example, a keyword "upper case letter" may be used to signal to the device to process audio following the utterance of "letter" using the models for the letters of the alphabet and input a letter corresponding to the audio in upper case format. In another example, a keyword "number" may be used to signal to the device to process audio following the utterance of "number" using the models for numeric numbers. In yet another example, a keyword "symbol" may be used to signal to the device to process audio following the utterance of "number" using the models for symbols.

The user device may also be pre-programmed with a limited number of output audio segments corresponding to phrases relating to queries to the user and/or instructions for setting up the user device. For example, the user device may be preprogrammed with audio segments corresponding to such phrases as: please spell a network identifier (ID), please spell a password, and other phrases as described in further detail below. Allowing a user to set-up a user device using audible commands reduces customer frustration, reduces the need for out of band communication with another devices, and increases efficiency.

FIG. 1 illustrates an overview of a system 100 for implementing embodiments of the disclosure. The system includes a user device 102 and a remote device 104. In this example, the user device 102 is initially unable to connect to a network 106 to communicate with the remote device 104. To establish a connection to the network 106, the user device 102 may require a user 108 to select a wireless network (such as a WiFi network of the user) and enter a password corresponding to the wireless network. In this respect, the user device 102 may include one or more locally stored speech models that allow the user 108 to select and/or input network credentials into the user device 102 using audible commands (without a graphical user interface or out of band communication channel with another device).

The user device 102 may initiate a network configuration in response to a configuration event. The configuration event may be the user 108 turning the user device 102 on for the first time, pressing a button, uttering a certain keyword corresponding to the configuration, and/or other such action. In response to the configuration event, the user device 102 may query the user for wireless network credentials via an audio output, illustrated as block 110. This query may include a number of steps and dialogue between the user 108 and the user device 102. For example, the user device 102 may detect available wireless network signals (for example, wireless network signals within range of the user device 102), and query the user 108 for which wireless network or wireless router associated with a wireless network should be used, determine security protocols associated with the network, and query the user 108 for a password for the wireless network, etc. More specific exemplary implementations are described below in further detail.

In response to the query of block 110, the user 108 may utter the credentials using audible commands. The user device 102 may receive the audible commands as audio input, illustrated as block 112, and process the audio input using keyword spotting techniques locally using locally stored models, illustrated as block 114. When the user device 102 is able to identify the desired wireless network, for example, using a network ID and password, the user device 102 connects to the desired wireless network, illustrated as block 116.

As an example of such a query and dialogue, the user device 102 may query the user 108 for a network identification, by presenting an audible instruction, such as "please say the name of your network." The user 108 then responds with the name of the network. If the user's response is unclear the user device 102 may request the user 108 to repeat the network name. The user device 102 compares the user's response against the detected networks and selects the one that is closest, and repeats the selected network name to the user 108 for confirmation. For example, "is John's Network correct?" The user 108 may then confirm, for example by saying "yes." The user device 102 may then determine security protocols associated with the network. The user device 102 may then query the user 108 to spell the password for the network, for example, "please spell your password."

Once the user device 102 is connected to the desired wireless network, the user device 102 may then be able to communicate with the remote device 104 via the network 106. The user device 102 may then limit a local audio processing mode of the user device 102, illustrated as block 118. The local audio processing mode of the user device 102 may be limited to prevent the user device 102 from reacting to accidental keyword utterances relating to the local models (as described above). Instead, the user device 102 may enable a remote ASR/NLU processing mode in which the user device 102 sends all detected audio to the remote device 104 for processing in response to detecting a wake word or wake command. This mode may have a single keyword or waking command associated with it, which initializes the user device 102 to respond to one or more commands that follow the wake command. The user device 102 may continually listen for the wake command and may disregard any audio detected that does not include the wake command.

Once connected to the password protected network (e.g., network 106) the user device 102 may be able to communicate with remote device 104, and thus may be able to make use of the ability of the remote device 104 to perform more complicated ASR/NLU processing. For example, upon receiving an audio input including the wake command and an audible command, illustrated as block 120, the user device 102 may send the audio input to the remote device 104, illustrated as block 122. The remote device 104 receives the audio, illustrated as block 124, and processes the audio using ASR/NLU techniques, illustrated as block 126. The remote device 104 may have a large amount of computing power and connected to numerous databases. This allows the remote device 104 to process the audio, identify a command associated with the audio, and execute the command, illustrated as block 128. For example, the command may include any number of items, such as, order a certain product and have it shipped to the customer, etc. Prior to executing the command, the remote device 104 may also request user confirmation of the command from the user device 102. In this respect, the user device 102 may query the user 108 for confirmation of the command, and send the confirmation or confirmation failure to the remote device 104.

Figure 2:
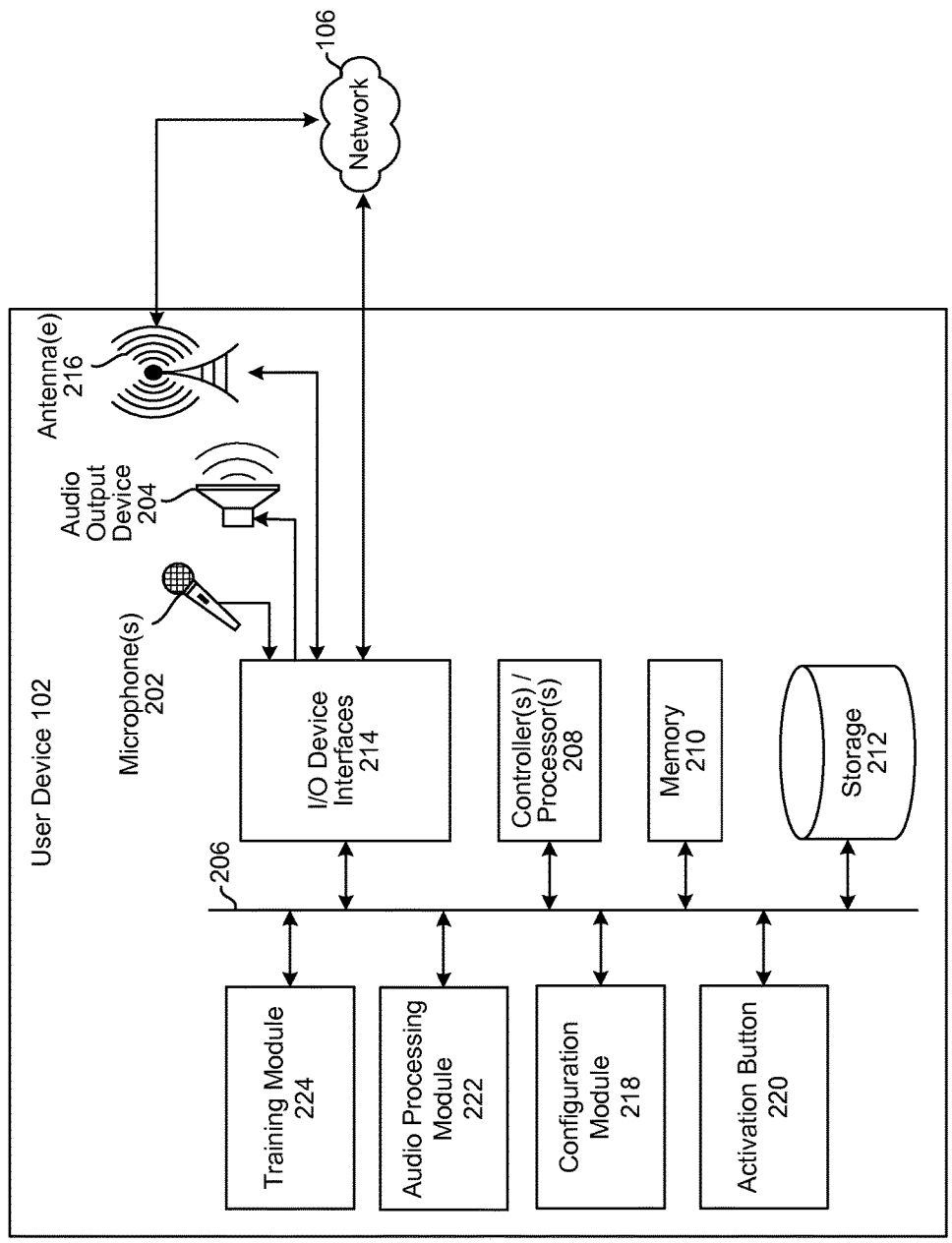
FIG. 2 is a block diagram conceptually illustrating an exemplary user device according to embodiments of the present disclosure.

FIG. 2 is a block diagram conceptually illustrating example components of the user device 102. In operation, the user device 102 may include computer-readable and computer-executable instructions that reside on the user device 102, as will be discussed further below.

The user device 102 may include one or more audio capture device(s), such as a microphone or an array of microphones 202, for receiving and capturing keywords and audible commands and other audio. The user device 102 may also include an audio output device for producing sound, such as speaker(s) 204. The audio capture device(s) and/or the audio output device may be integrated into the user device 102 or may be separate.

The user device 102 may include an address/data bus 206 for conveying data among components of the user device 102. Each component within the user device 102 may also be directly connected to other components in addition to (or instead of) being connected to other components across the bus 206.

The user device 102 may include one or more controllers/processors 208 that may each include a central processing unit (CPU) for processing data and computer-readable instructions, and a memory 210 for storing data and instructions. The memory 210 may include volatile random access memory (RAM), non-volatile read only memory (ROM), non-volatile magnetoresistive (MRAM) and/or other types of memory. The user device 102 may also include a data storage component 212, for storing data and controller/processor-executable instructions (e.g., instructions to perform the algorithms and methods illustrated in and described with reference to FIGS. 1, 3-10, and 12-14). The data storage component 212 may include one or more non-volatile storage types such as magnetic storage, optical storage, solid-state storage, etc. The user device 102 may also be connected to removable or external non-volatile memory and/or storage (such as a removable memory card, memory key drive, networked storage, etc.) through input/output device interfaces 214.

Computer instructions for operating the user device 102 and its various components may be executed by the controller(s)/processor(s) 208, using the memory 210 as temporary "working" storage at runtime. The computer instructions may be stored in a non-transitory manner in non-volatile memory 210, storage 212, or an external device. Alternatively, some or all of the executable instructions may be embedded in hardware or firmware in addition to or instead of software.

The user device 102 includes input/output device interfaces 214. A variety of components may be connected through the input/output device interfaces 214, such as the speaker(s) 204, the microphones 202, and/or other such components. The input/output device interfaces 214 may also include an interface for an external peripheral device connection such as universal serial bus (USB), FireWire, Thunderbolt or other connection protocol. The input/output device interfaces 214 may also include a connection to one or more networks 106 via an antennae 216, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The user device 102 may also include other limited output components, for example, one or more flashing light-emitting diodes (LEDs) (not shown).

The user device 102 may further include a configuration module 218, an activation button 220, an audio processing module 222, and/or a training module 224. The configuration module 210 may be initiated via activation of the activation button 220, turning of the user device 102 on for the first time, receiving an utterance of a certain keyword corresponding to the configuration, and/or other such action. The configuration module 218 may drive the configuration processes to query a user and present information to the user using audible output commands and queries to perform the algorithms and methods illustrated in and described with reference to FIGS. 1, 3-10, and 12-14. The storage 212 may store data (for example, pre-recorded phrases and queries, or other data) to enable the user device 102 to have a dialogue type discussion with a user in the process of receiving network credentials and other information, or presenting information to the user.

The audio processing module 222 receives captured audio of detected keywords and audible commands and any additional audio captured in the recording, and processes the audio to determine whether the audio corresponds to particular keywords and/or an audible command recognizable by the limited capabilities of the user device 102. The storage 212 may store data (for example, speech models relating to keywords, upper case and lower case letters of the alphabet, numbers, symbols, pattern recognition, and/or other data) relating to keywords and commands to enable the audio processing module to perform the algorithms and methods illustrated in and described with reference to FIGS. 1, 3-10, and 12-14. The locally stored speech models may be pre-configured based on known information, prior to the user device 102 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another user device. For example, the user may own another user device that the user operates via spoken commands, and this speech data may be associated with a user profile. The speech data from the other user device may then be leveraged and used to train the locally stored speech models of the user device 102 prior to the user device 102 being delivered to the user or configured to access the network by the user.

The audio processing module 222 may access the storage 212 and compare the captured audio to the stored models and audio sequences using audio comparison, pattern recognition, keyword spotting, audio signature, and/or other audio processing techniques.

To process the recording/captured keywords and/or audible commands, the audio processing module 222 may employ speech/audio comparison techniques. For example, the audio processing module 222 may use audio or acoustic fingerprinting techniques to compare audio input to stored audio signatures and models from find a match. The audio processing module 222 may also use phoneme or phrase recognition models and pattern recognition.

In general, a phrase model or audio signature may be created for each keyword and/or audible command. When identifying whether a captured keyword and/or audible command matches a stored keyword and/or audible command, acoustic models for the keyword and/or audible command may be compared to the captured keyword and/or audible command. In one aspect, the phrase models may be created based on phoneme models (or other subword units). In this aspect, a phoneme model is akin to an acoustic model. A Hidden Markov Model (HMM) may also be created for each keyword and/or audible command by concatenating the HMM states for the relevant phonemes together. In this aspect, the HMM for each keyword and/or audible command may be created based on the stored audio.

The training module 224 may be used to train the locally stored speech models prior to the user device 102 being delivered to the user or configured to access the network by the user, as described herein. The training module 224 may be used to train the locally stored speech models during the configuration of the user device 102 to access the network based on the audio input of the user, as described in further detail below.

The user device 102 may include all or a subset of the components described above. FIGS. 3-10 illustrate exemplary methods of processing the captured audio containing a keyword and/or audible command according to embodiments of the present disclosure. It should be appreciated that each of the methods described with reference to FIGS. 1 and 3-10 may be combined with one or more of the other methods, and one or more steps of a methods may be incorporated into the other methods. Further, one or more of the components described above with reference to FIG. 2 may be used to perform the steps of the methods described herein.

Figure 3:
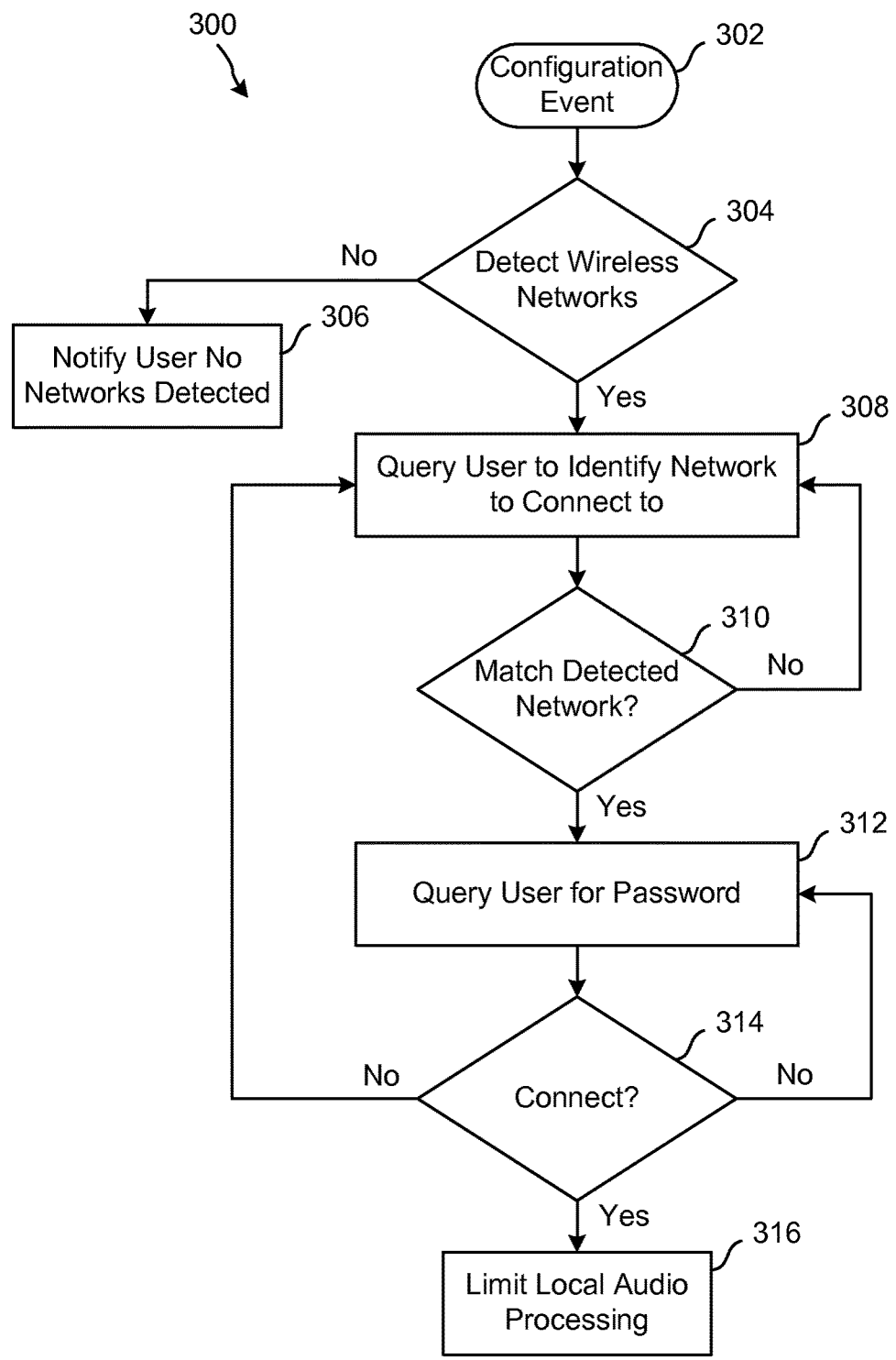
FIG. 3 illustrates an exemplary method of configuring the user device using audible commands according to embodiments of the present disclosure.

FIG. 3 illustrates an exemplary method 300 of configuring the user device using audible commands according to embodiments of the present disclosure. In block 302, a configuration event is triggered. This initiates the configuration process and may be triggered in response to the user device turning on for the first time, activation of a button, utterance of a certain keyword corresponding to the configuration, and/or other such action. In response to the configuration event, the user device detects available wireless network signals in the vicinity of the user device, illustrated as block 304. When no wireless network signals are detected, the user device may notify the user that there are no visible wireless networks detected, illustrated as block 306. This notification may be an audible notification, for example, presented to the user through the audio output device (such as the speaker) described above.

When wireless network signals are detected, the user device may query the user to identify which wireless network the user device should connect to and use, illustrated as block 308. Again this query and any other query, confirmation, notification, or other type of communication to the user, described herein, may be audible (such as, an audio output) and presented to the user through the audio output device (such as the speaker) described above. The user may then respond to the query via an audible command, as described in further detail below.

The user device receives or captures the audible command as audio input of the user, for example, via the audio capture device (such as the microphone) described above. The user device processes the audio input using local audio processing techniques and determines whether the audio input corresponds to at least one of the detected wireless networks, illustrated as block 310. When the audio input does not substantially match any of the detected wireless networks or the audio is unclear, the user device may query the user to identify which wireless network the user device should connect to and use, illustrated as block 308.

When the audio input substantially matches at least one of the detected wireless networks, the user device may query the user to enter a password for accessing the wireless network, illustrated as block 312. The user responds to the query via one or more audible commands, as described in further detail below. The user device receives or captures the audible command(s) as audio input of the user, for example, via the audio capture device (such as the microphone) described above. The user device processes the audio input using local audio processing techniques and attempts to connect to the wireless network, illustrated as block 314. When the user device is unable to connect to the wireless network, the user device may query the user to re-enter a password for accessing the wireless network, illustrated as block 312. When the user device is unable to connect to the wireless network, the user device may alternatively proceed back up to block 308 and query the user to identify which wireless network the user device should connect to and use.

When the user device is able to connect to the wireless network, the user device may limit local audio processing, illustrated as block 316. Since the user device is connect to the network, the user device may now communicate with a more powerful remote device to perform ASR/NLU processing and other functions. In this respect, the local audio processing may be limited to detection of a wake word or wake command that signals to the user device to capture audio input and send the audio to the remote device for processing.

Figure 4:
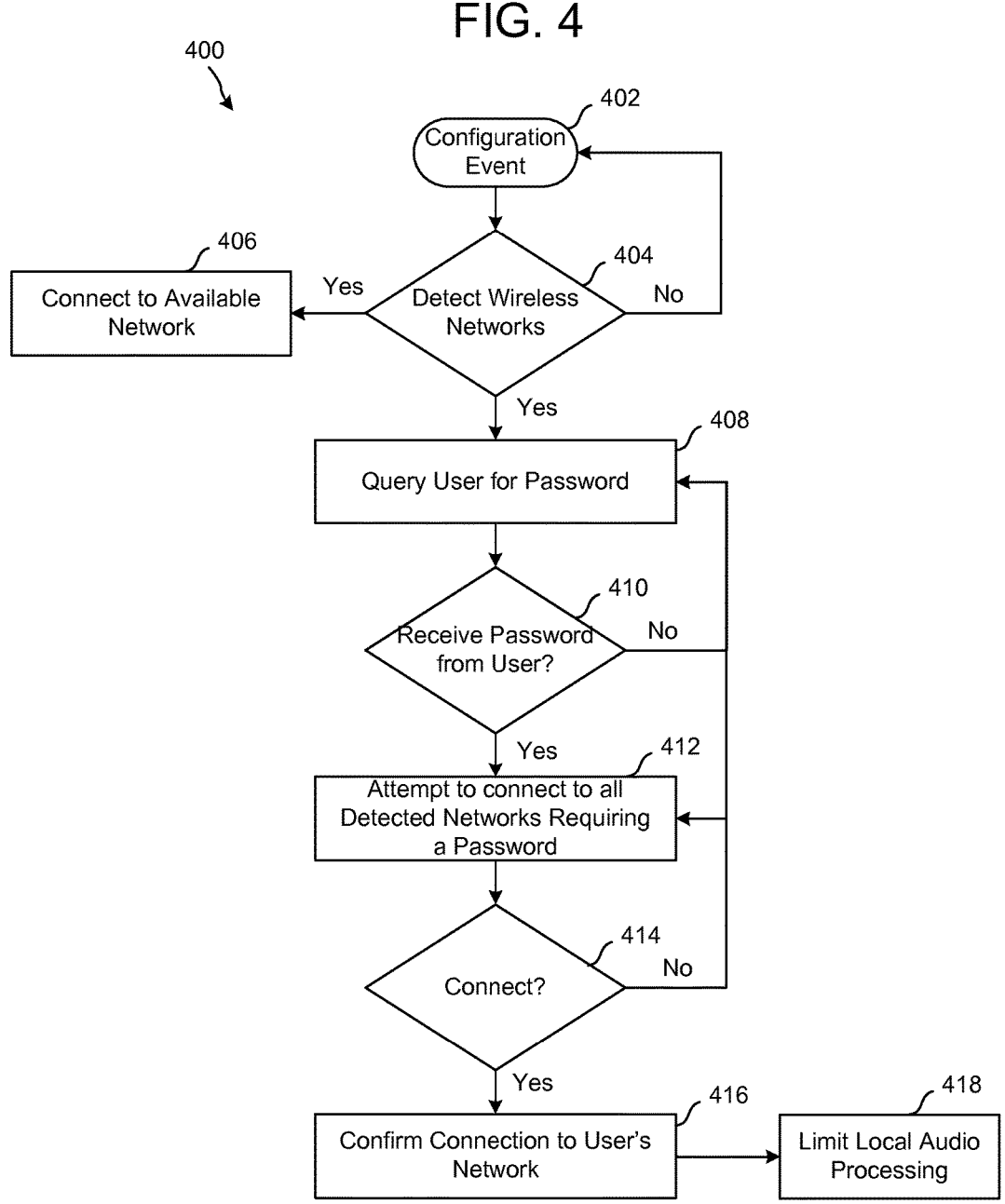
FIG. 4 illustrates another exemplary method of configuring the user device using audible commands according to embodiments of the present disclosure.

Since the user device is capable of detecting available wireless networks, it may be unnecessary for the user to identify the network name and/or service set identifier (SSID). FIG. 4 illustrates another exemplary method 400 of configuring the user device in which the user may forego having to identify the wireless network to which the user device is to connect according to embodiments of the present disclosure. In block 402, a configuration event is triggered. In response to the configuration event, the user device detects available wireless network signals in the vicinity of the user device, illustrated as block 404. When no wireless network signals are detected, the user device may notify the user that there are no visible wireless networks detected and wait for another configuration event to be triggered. When wireless network signals are detected, the user device may determine whether the wireless network signals require a password to connect to the wireless network signals. When a detected wireless network does not require a password (i.e., is unsecure), the user device may simply connect to the wireless network, illustrated as block 406, or disregard such wireless network signals due to the lack of security. To make the determination of whether or not to connect to the unsecure wireless network, the user device may query the user to confirm whether then user device should connect to the unsecure wireless network.

When wireless network signals are detected that require a password, the user device may query the user to enter a password for accessing the user's wireless network, illustrated as block 408 and await to receive the user's response, illustrated as block 410. The user responds to the query via one or more audible commands. When the user device fails to receive or the user's response is unclear, the user device may re-query the user for the password.

When the user device receives or captures the audible command(s) as audio input of the user, for example, via the audio capture device (such as the microphone) described above, the user device processes the audio input using local audio processing techniques and attempts to connect to all visible wireless networks that require a password and were detected using the password, illustrated as blocks 412 and 414. The password should only work and allow the user device to connect to the user's network. Thus, attempting to access all wireless networks, should result in the user device connecting to the user's wireless network without requiring the user to identify the network name or SSID. This streamlines the user experience and configuration process.

When the user device is unable to connect to any wireless network, the user device may re-attempt to connect to all detected wireless networks requiring a password again and/or query the user to re-enter a password for accessing the wireless network. When the user device is able to connect to a wireless network using the password, the user device may confirm the user device is connected to the user's desired wireless network, illustrated as block 416, for example, by presenting the user with the wireless network name and/or SSID of the network and asking the user to confirm. The user device may also limit local audio processing, illustrated as block 418. Since the user device is now connect to the network, the user device may communicate with a more powerful remote device to perform ASR/NLU processing and other functions.

Figure 5:
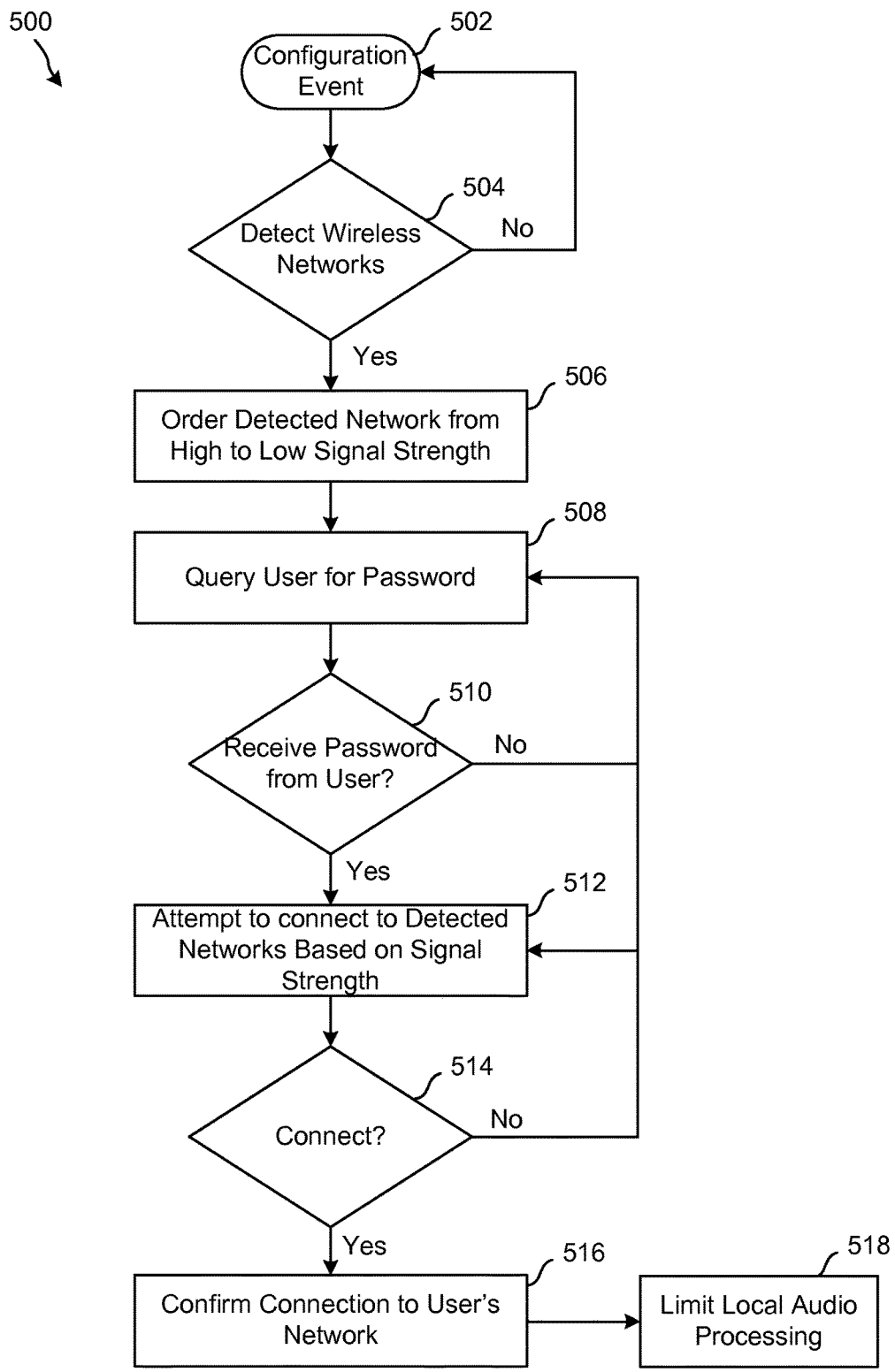
FIG. 5 illustrates another exemplary method of configuring the user device using audible commands according to embodiments of the present disclosure.

FIG. 5 illustrates another exemplary method 500 of configuring the user device according to embodiments of the present disclosure. In block 502, a configuration event is triggered. In response to the configuration event, the user device detects available wireless network signals in the vicinity of the user device, illustrated as block 504. When no wireless network signals are detected, the user device may notify the user that there are no visible wireless networks detected and wait for another configuration event to be triggered. When wireless network signals are detected, the user device may order the detected networks in order of highest signal strength to lowest signal strength, illustrated as block 506. The user device may also query the user to enter a password for accessing the user's wireless network, illustrated as block 508 and await to receive the user's response, illustrated as block 510. The user responds to the query via one or more audible commands. When the user device fails to receive or the user's response is unclear, the user device may re-query the user for the password.

When the user device receives or captures the audible command(s) as audio input of the user, for example, via the audio capture device (such as the microphone) described above, the user device processes the audio input using local audio processing techniques and attempts to connect to the detected wireless networks using the password in order from highest to lowest signal strength, illustrated as blocks 512 and 514. The user's network should have the highest signal strength and the password should only work and allow the user device to connect to the user's network. Thus, attempting to access all wireless networks detected in order, should result in the user device connecting to the user's wireless network without requiring the user to identify the network name or SSID. This streamlines the user experience and configuration process.

When the user device is unable to connect to any wireless network, the user device may re-attempt to connect to all detected wireless networks again and/or query the user to re-enter a password for accessing the wireless network. When the user device is able to connect to a wireless network using the password, the user device may confirm the user device is connected to the user's desired wireless network, illustrated as block 516, for example, by presenting the user with the wireless network name and/or SSID of the network and asking the user to confirm. The user device may also limit local ASR processing, illustrated as block 518. Since the user device is now connect to the network, the user device may communicate with a more powerful remote device to perform ASR/NLU processing and other functions.

Figure 6:
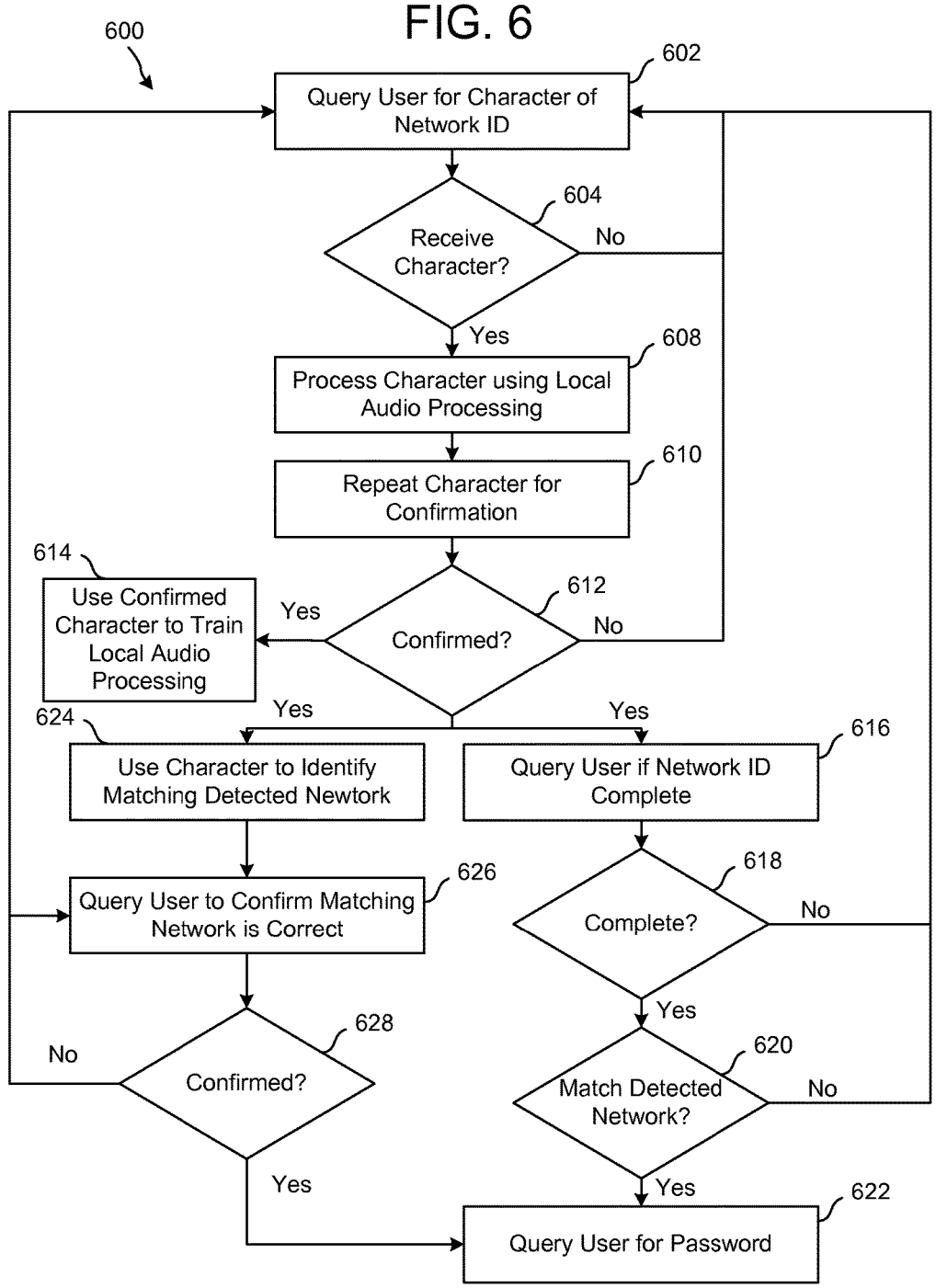
FIG. 6 illustrates an exemplary method of configuring the user device with a network identifier (ID) using audible commands according to embodiments of the present disclosure.

In a more detailed example, the query of the user device to the user to identify a wireless network may include one or more steps. These steps may include a dialogue type interaction with the user. FIG. 6 illustrates an exemplary method 600 of configuring the user device with a network ID (i.e., a network name and/or SSID, and/or whether the network is hidden) using audible commands according to embodiments of the present disclosure. In block 602, the user device queries the user for a character (such as a first alphanumeric or symbol character of a spelling) of the network ID, and awaits to receive the user's response, illustrated as block 604. The user responds with an audible command as audio input to the user device. The audible command may include a keyword, such as "letter," followed by an utterance of a letter, such as "a." When the user device fails to receive or the user's response is unclear, the user device may re-query the user for the password.

When the user device receives or captures the audible command as audio input of the user, for example, via the audio capture device (such as the microphone) described above, the user device processes the audio input using local audio processing techniques, illustrated as block 608. The user device may use one or more of the speech models described above to process the audio input. The user device may also repeat the character resulting from the audio processing (which may include—"Did you say "a" as in apple?") to the user for confirmation, illustrated as blocks 610 and 612. The user device may have a number of audio segments corresponding to such questions pre-stored to use when confirming user input. When the character repeated by the user device does not match what the user intended to utter, the user may not confirm the character, for example, by saying "no", "incorrect", or other such designation, word, or phrase. When the character fails to be confirmed, the user device may re-peat the process, starting from block 602 again for that character.

When the character is confirmed, the user device may use the confirmed character as training data to train the locally stored speech models, illustrated as block 614. This allows the user device to adapt the local audio processing to the speech characteristics of the user. Thus, causing the local audio processing to increase the accuracy of the audio processing of subsequent audio input.

When the character is confirmed, the user device may query the user whether or not the spelling of the network ID is complete, and await for the user to respond, illustrated as blocks 616 and 618. When the user identifies that the spelling of the network ID is not complete, the user device may re-peat the process, starting from block 602 again for a next character of the spelling of the network ID. This process may be repeated until all characters of the network ID have been successfully received by the user device. As described above, all queries, confirmations, notifications, or other types of communication to the user, described herein, are audible and presented to the user through the audio output device (such as the speaker) described above. Similarly, all of the user responses described herein are audible responses captured or received as audio input via the audio capture device (such as the microphone) described above.

When the user identifies that the spelling of the network ID is complete, the user device may determine whether the network ID provided by the user substantially matches at least one of the network IDs detected by the user device, illustrated as block 620. When there is no detected network ID substantially matching or corresponding to the network ID provided by the user, the user device may restart the process, starting from block 602 again to obtain a new network ID or retry the network ID. When there is at least one detected network ID that substantially matches or corresponds to the network ID provided by the user, the user device may query the user for the password, illustrated as block 622, as described herein with respect to one or more of the other FIGS.

Additionally or alternatively, when the character is confirmed, the user device may use the confirmed character and determine whether any of the identified networks match the spelling of the confirmed character(s), illustrated as block 624. For example, if the confirmed character is "J" and a first character of a network name, and only one detected network begins with the character "J", the user device may determine the detected network beginning with the character "J" is the user's network. The user device may then query the user to confirm whether the detected network determined to be a match is the correct network, illustrated as blocks 626 and 628. When the user confirms, the user device may query the user for the password, illustrated as block 622.

When the user fails to confirm or identifies that the network is not correct, the user device may repeat the process starting from block 626 or 602. For example, when the confirmed character is "J" and the first character of a network name, and more than one detected network begins with the character "J", the user device may query the user whether each of the detected networks beginning with the character "J" is the user's network (i.e., repeating the process starting from block 626). When the user fails to confirm or identifies that the network is not correct, the user device could repeat the process, starting from block 602 again for a next character of the spelling of the network ID. This process may be repeated until enough characters of the network ID have been successfully received by the user device to determine the user's network.

Figure 7:
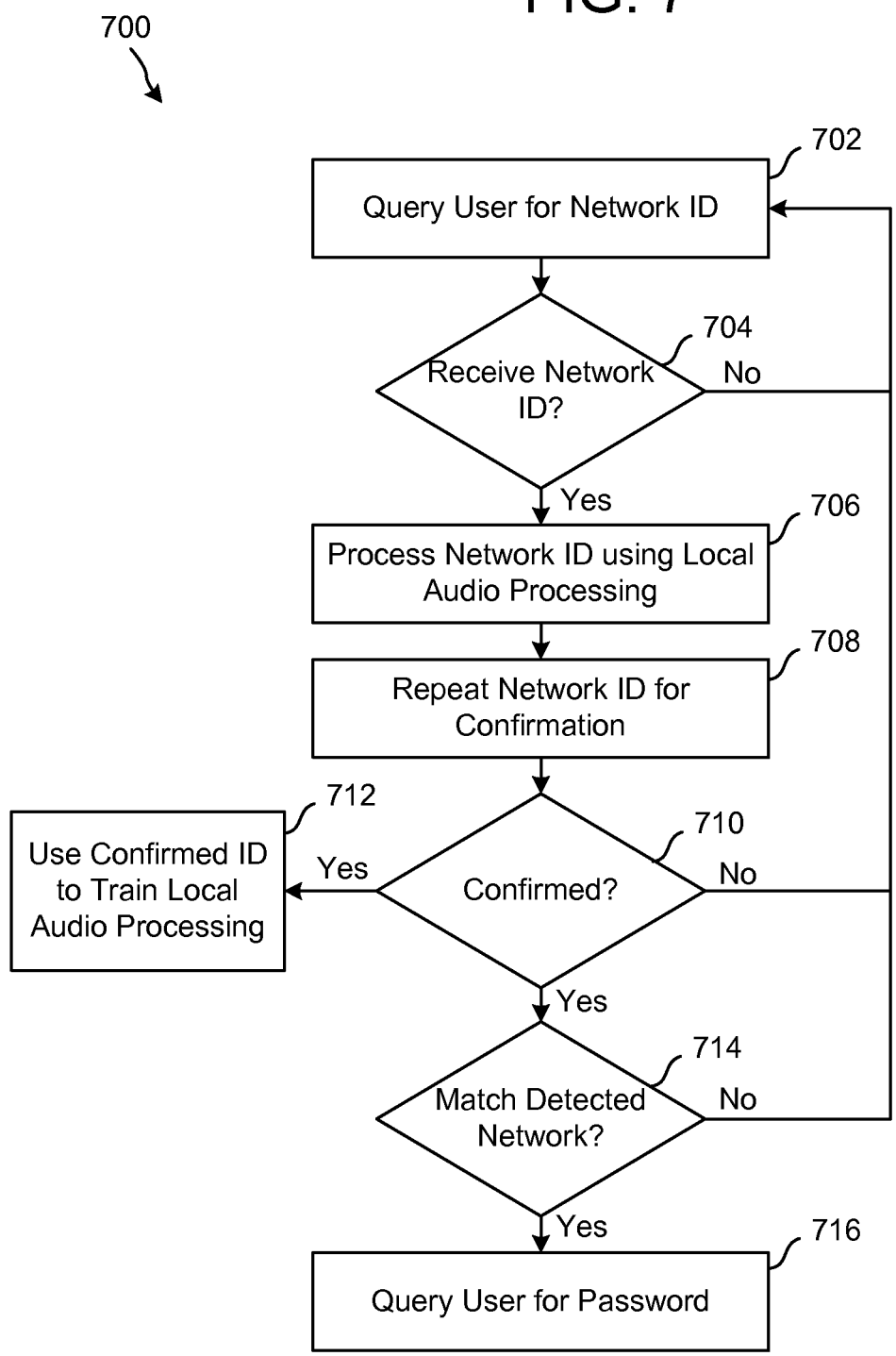
FIG. 7 illustrates another exemplary method of configuring the user device with a network ID using audible commands according to embodiments of the present disclosure.

FIG. 7 illustrates another exemplary method 700 of configuring the user device with a network ID using audible commands according to embodiments of the present disclosure. In block 702, the user device queries the user for a network ID (such as a name "JohnN"), and awaits to receive the user's response, illustrated as block 704. The user responds with an audible command as audio input to the user device. The audible command may include a name or phrase corresponding to the network ID. When the user device fails to receive or the user's response is unclear, the user device may re-query the user for the password.

When the user device receives or captures the audible command as audio input, the user device processes the audio input using local audio processing techniques, illustrated as block 706. The user device may use one or more of the speech models described above to process the audio input. The user device may also repeat the network ID resulting from the audio processing (i.e., which should be "JohnN" in this example) to the user for confirmation, illustrated as blocks 708 and 710. When the network ID resulting from the audio processing repeated by the user device does not correspond to what the user intended to utter, the user may not confirm the network ID resulting from the audio processing, for example, by saying "no", "incorrect", or other such designation, word, or phrase. When the network ID resulting from the ASR processing fails to be confirmed, the user device may re-peat the process, starting from block 702 again.

When the network ID resulting from the audio processing is confirmed, the user device may use the confirmed data as training data to train the locally stored speech models, illustrated as block 712. This allows the user device to adapt the local audio processing to the speech characteristics of the user. Thus, causing the local audio processing to increase the accuracy of the audio processing of subsequent audio input.

When the network ID resulting from the audio processing is confirmed, the user device determines whether the network ID provided by the user substantially matches at least one of the network IDs detected by the user device, illustrated as block 714. When there is no detected network ID substantially matching or corresponding to the network ID provided by the user, the user device may restart the process, starting from block 702 again to obtain a new network ID or retry the network ID. When there is at least one detected network ID that substantially matches or corresponds to the network ID provided by the user, the user device may query the user for the password, illustrated as block 716, as described herein with respect to one or more of the other FIGS.

Figure 8:
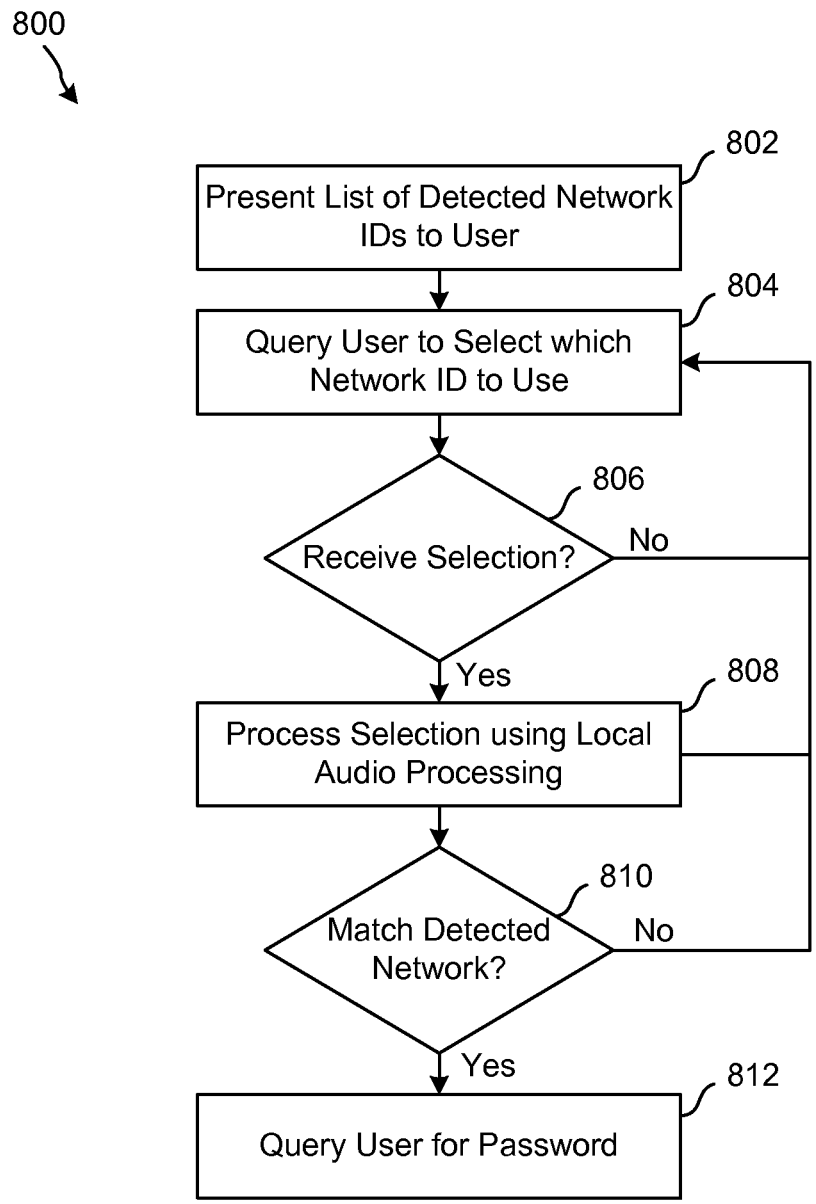
FIG. 8 illustrates another exemplary method of configuring the user device with a network ID using audible commands according to embodiments of the present disclosure.

The user device may also present a user with a list of detected wireless networks and ask the user to select one from the list. FIG. 8 illustrates another exemplary method 800 of configuring the user device with a network ID using audible commands according to embodiments of the present disclosure. In block 802, the user device presents the user with a list of network IDs that the user device detects, which may include an identifier/name of a wireless network or wireless router associated with a wireless network. This list may be in a numbered, lettered, or other form. For example, I detect 1—ABC, 2—HIJ, 3—XYZ, and 4—Hidden. The user device then queries the user to select which network the user device should connect, illustrated as block 804, and awaits to receive the user's response, illustrated as block 806. The user responds with an audible command as audio input to the user device. The audible command may include a name or phrase corresponding to the network ID or a number or letter corresponding to the network ID in the list. For example, the user may select option "2" corresponding to network "HIJ". When the user device fails to receive or the user's response is unclear, the user device may re-query the user for the network.

When the user device receives or captures the audible command as audio input, the user device processes the audio input using local audio processing techniques, illustrated as block 808. The user device may use one or more of the speech models described above to process the audio input.

The user device may then determine whether the selection provided by the user substantially matches at least one of the network IDs detected by the user device, illustrated as block 810. When there is no detected network ID substantially matching or corresponding to the user's election, the user device may restart the process, starting from block 804 again to obtain a new selection. When there is at least one detected network ID that substantially matches or corresponds to the user's selection, the user device may determine security protocols associated with the network ID and query the user for the password, illustrated as block 812, as described herein with respect to one or more of the other FIGS.

Figure 9:
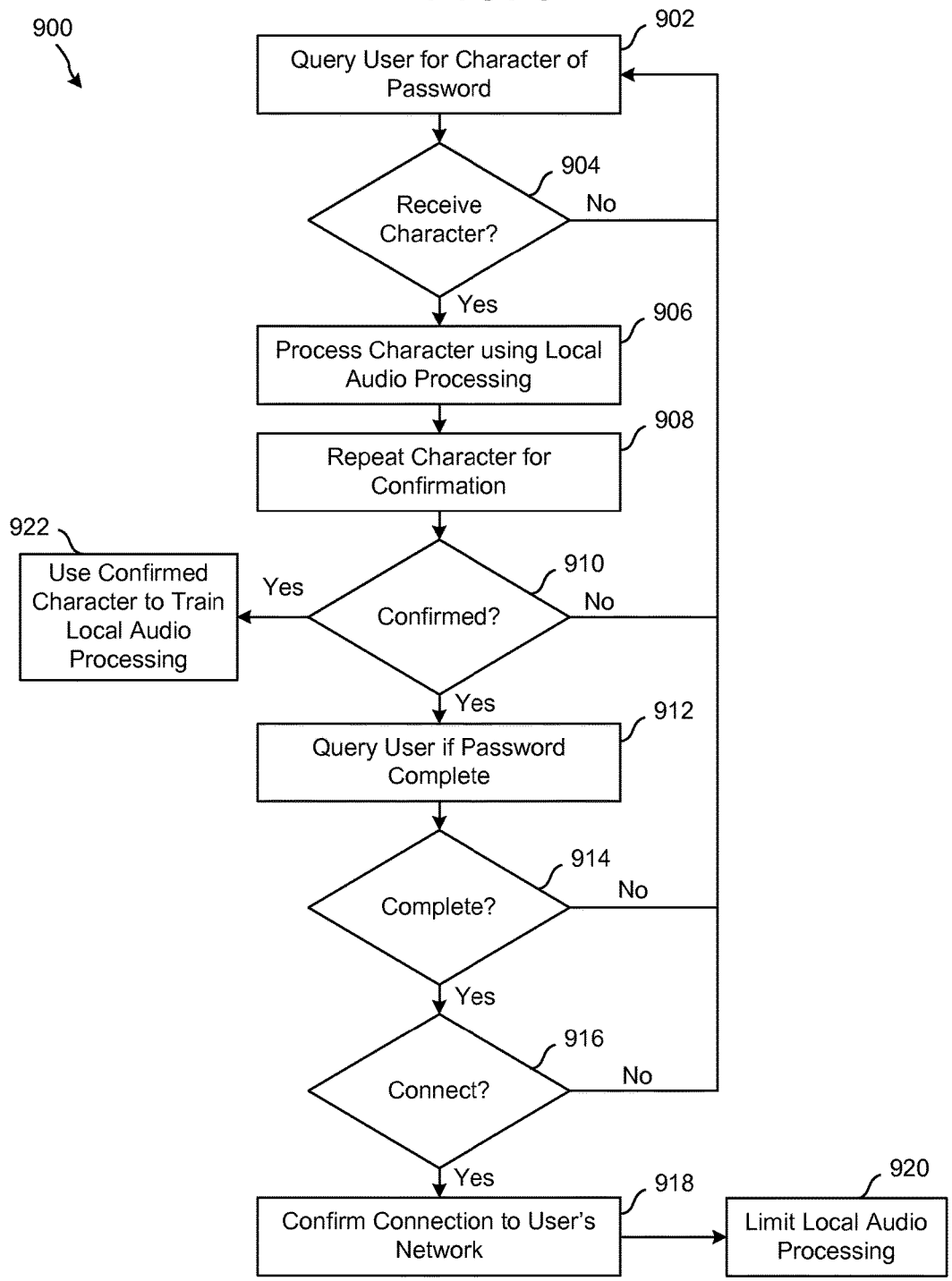
FIG. 9 illustrates an exemplary method of configuring the user device with a network password using audible commands according to embodiments of the present disclosure.

Similar to the method 600 described above with reference to FIG. 6, the query for the password may include one or more steps. FIG. 9 illustrates an exemplary method 900 of configuring the user device with a network password using audible commands according to embodiments of the present disclosure. In block 902, the user device queries the user for a character (such as a first character of a spelling) of a password, and awaits to receive the user's response, illustrated as block 904. The user responds with an audible command as audio input to the user device. The audible command may include a keyword, such as "letter," followed by an utterance of a letter, such as "a." When the user device fails to receive or the user's response is unclear, the user device may re-query the user for the password.

When the user device receives or captures the audible command as audio input of the user, for example, via the audio capture device (such as the microphone) described above, the user device processes the audio input using local audio processing techniques, illustrated as block 906. The user device may use one or more of the speech models described above to process the audio input. The user device may also repeat the character resulting from the audio processing (which should be letter "a" in this example) to the user for confirmation, illustrated as blocks 908 and 910. When the character repeated by the user device does not match what the user intended to utter, the user may not confirm the character, for example, by saying "no", "incorrect", or other such designation, word, or phrase. When the character fails to be confirmed, the user device may re-peat the process, starting from block 902 again for that character.

When the character is confirmed, the user device may query the user whether or not the spelling of the password is complete, and await for the user to respond, illustrated as blocks 912 and 914. When the user identifies that the spelling of the password is not complete, the user device may re-peat the process, starting from block 902 again for a next character of the spelling of the password. This process may be repeated until all characters of the password have been successfully received by the user device.

When the user identifies that the spelling of the password is complete, the user device may attempt to connect to the network using the password, illustrated as block 916. When the user device is unable to connect to the network, the user device may restart the process, starting from block 902 again to obtain a new password or retry the password. When the user device is able to connect to the network using the password, the user device may confirm the user device is connected to the user's desired network, illustrated as block 918, for example, by presenting the user with the network name and/or SSID of the network and asking the user to confirm. The user device may also limit local ASR processing, illustrated as block 920.

In a similar manner as described above, when the character resulting from the audio processing is confirmed, the user device may use the confirmed character as training data to train the locally stored speech models, illustrated as block 922. This allows the user device to adapt the local audio processing to the speech characteristics of the user. Thus, causing the local audio processing to increase the accuracy of the audio processing of subsequent audio input.

Figure 10:
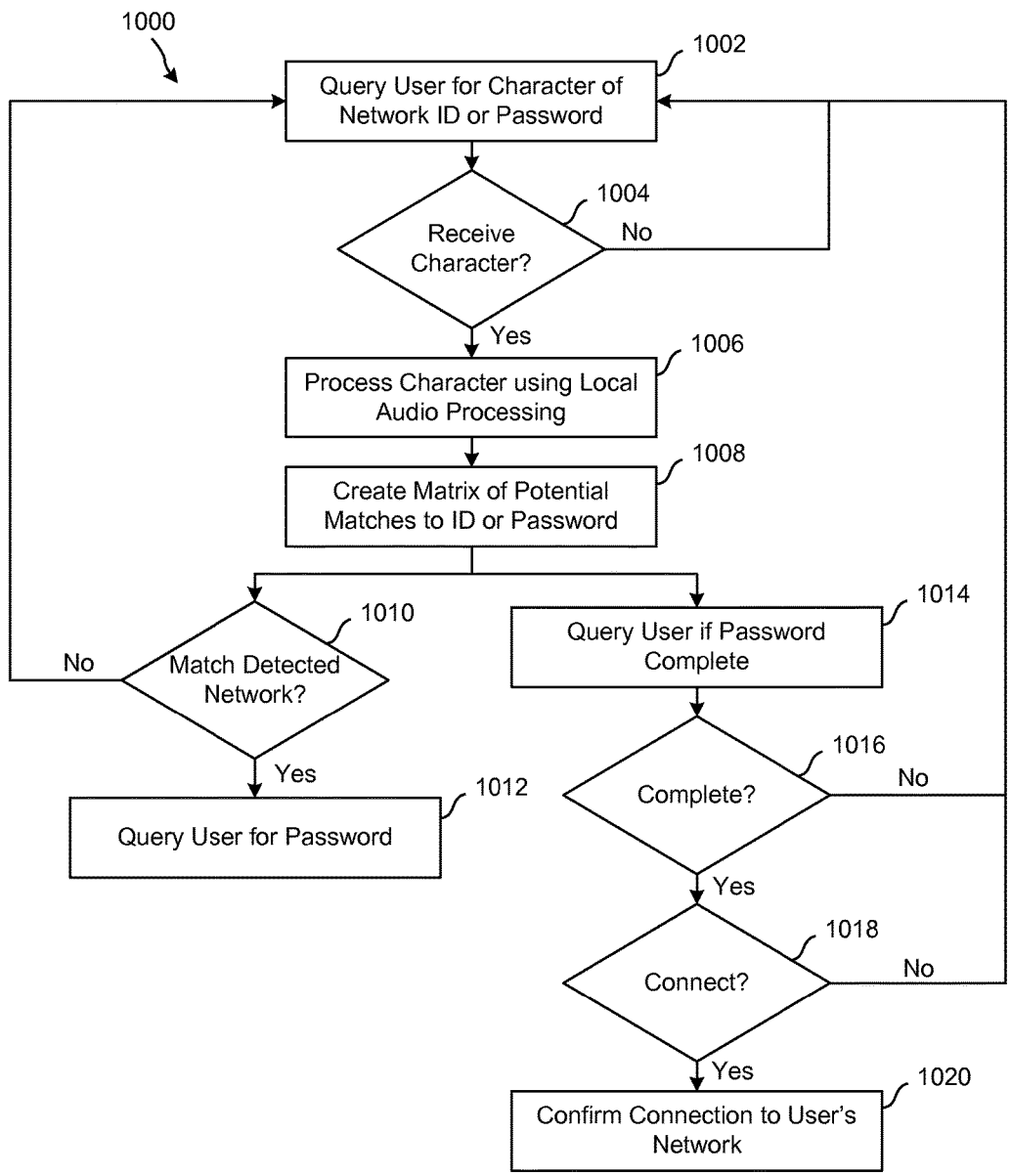
FIG. 10 illustrates an exemplary method of configuring the user device with a network ID and/or password using audible commands according to embodiments of the present disclosure.

FIG. 10 illustrates another exemplary method 1000 of configuring the user device with a network ID and/or password using audible commands according to embodiments of the present disclosure. In block 1002, the user device queries the user for a character (such as a first character of a spelling) of a network ID or password, and awaits to receive the user's response, illustrated as block 1004. The user responds with an audible command as audio input to the user device. The audible command may include a keyword, such as "letter," followed by an utterance of a letter, such as "a." When the user device fails to receive or the user's response is unclear, the user device may re-query the user for the network ID or password.

When the user device receives or captures the audible command as audio input of the user, for example, via the audio capture device (such as the microphone) described above, the user device processes the audio input using local audio processing techniques, illustrated as block 1006. The user device may use one or more of the speech models described above to process the audio input.

The user device may then create a matrix of potential matches to the network ID or password, illustrated as block 1008. For example, when the audio input relates to the letter "b", the user device may be unsure whether the input is letter "b", letter "d", letter "e", etc., or whether the letter is lower case or upper case. In this respect, the user device may generate a matrix of potential matches of the audio input, such as: 1) b; 2) d; 3) e; 4) B; 5) D; 6) E. In creating the matrix, the user device may compare the audio input to the locally stored speech models of keyword and determine a confidence score that the audio input matches the speech models. When the confidence score is less than a threshold value (such as 75%), the user device may select all potential matches having a confidence score of about 50% to about 75% and add them to the matrix.

When the audio input relates to a network ID, the user device may use the various potential matches to determine whether any of the identified networks match one or more of the potential matches, illustrated as block 1010, as described above with reference to FIG. 6. When there is at least one detected network that matches the input (wherein the match may be a first letter of the network ID), the user device may select the best match and query the user for the password, illustrated as block 1012. When there is not match or there is not a clear match (i.e., multiple potential matches), the user device may repeat the process starting from block 1002 to obtain a next character of the spelling of the network ID. This process may be repeated until enough characters of the network ID have been successfully received by the user device to determine the user's network.

When the audio input relates to a password, the user device may query the user whether or not the spelling of the password is complete, and await for the user to respond, illustrated as blocks 1014 and 1016. When the user identifies that the spelling of the password is not complete, the user device may re-peat the process, starting from block 1002 again for a next character of the spelling of the password. This process may be repeated until all characters of the password have been successfully received by the user device.

When the user identifies that the spelling of the password is complete, the user device may attempt to connect to the network using the password, illustrated as block 1018. When the user device is unable to connect to the network, the user device may restart the process, starting from block 1002 again to obtain a new password or retry the password. When the user device is able to connect to the network using the password, the user device may confirm the user device is connected to the user's desired network, illustrated as block 1020, for example, by presenting the user with the network name and/or SSID of the network and asking the user to confirm.

In another aspect, the user device may use a dictionary function to predict next characters or potential characters of a network ID and/or password. This enables the user device to reduce the amount of input required from the user, and simply query the user whether or not the predicted network or password is correct.

Once the user device is connected to the user's network, the user device may communicate with a more powerful remote device (such as remote device 104 illustrated in FIG. 1) via a network (such as network 106 illustrated in FIGS. 1 and 2) to perform ASR/NLU and other operations. Through the network 106, one or more components may be distributed across a networked environment. For example, multiple computing devices (such as the user device 102 and the remote device 104) may be employed in a system. In such a multi-device system, each of the computing devices may include different components for performing different aspects of the processes described herein. The multiple devices may include overlapping components. The components of the user device 102 as illustrated in FIG. 2 is exemplary, and may be a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Figure 11:
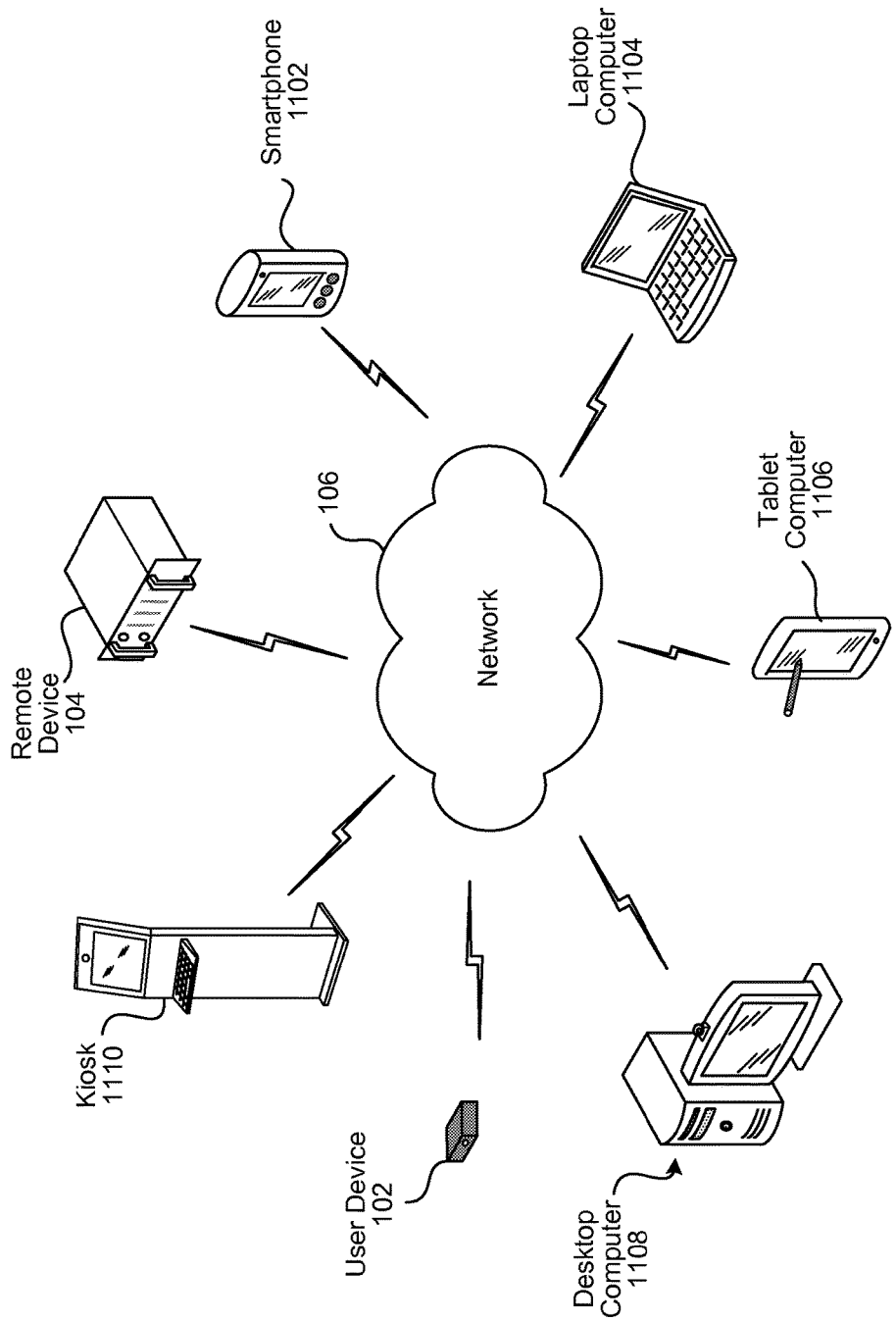
FIG. 11 illustrates a computer network for use with distributed processing according to embodiments of the present disclosure.
Figure 12:
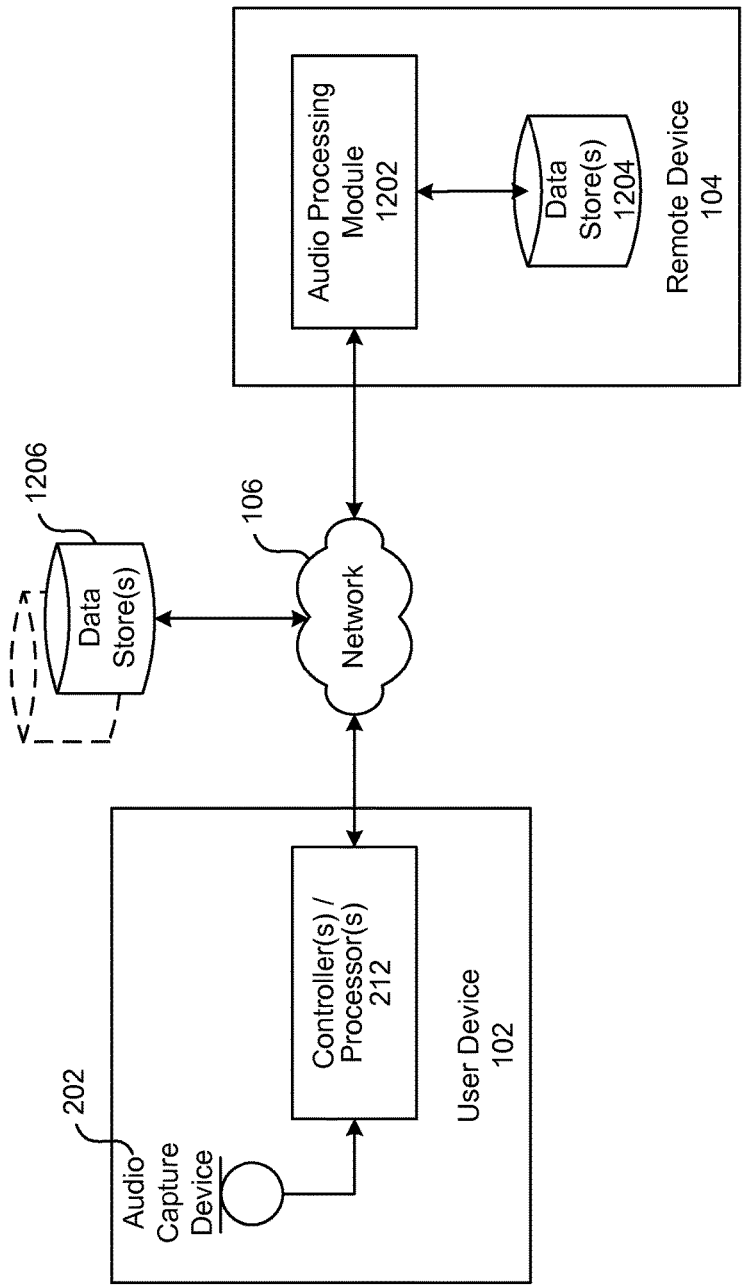
FIG. 12 illustrates an overview of a distributed processing system for implementing embodiments of the present disclosure.

As illustrated in FIG. 11, multiple devices (102, 104, and 1102-1110) may contain components of the system and the devices may be connected over the network 106. Network 106 may include a local or private network or may include a wide network such as the internet. Devices may be connected to the network 106 through either wired or wireless connections. For example, a smartphone 1102, a laptop computer 1104, a tablet computer 1106, a desktop computer 1108, a kiosk 1110, and the user device 102, and remote device 104 may be connected to the network 106 through a wireless service provider, over a WiFi or cellular network connection or the like, or a wired connection. These networked devices may include embedded audio input devices, such as an internal microphone and speaker, and one or more of the devices may include an audio processing module.

In certain system configurations, once the user device 102 is connected to the user's network and is capable of communicating over the network 106, the user device 102 may capture audio relating to keywords and/or audible commands and another device may process the captured audio to determine whether the captured audio corresponds to an utterance of a keyword and/or audible command that should be acted upon or executed. In an example, referring to FIG. 12, the user device 102 may capture audio relating to the utterance of a keyword and/or audible command via the audio capture device 202. Because processing the captured audio may involve significant computational resources (for example, comparing the captured audio with many stored audio samples and/or speech models in a short amount of time), in terms of both storage and processing power, the user device 102 and/or controller 212 of the user device 102 may send the captured audio to the remote device 104 over network 106. The remote device 104 may include an audio processing module 1202 (described in further detail with reference to FIG. 15 below) and one or more data stores 1204 (described in further detail with reference to FIG. 15 below). The remote device 104 and/or the user device 102 may also be in communication with one or more additional data stores 1206 via the network 106.

In general, the remote device 104 receives the captured audio from the user device 102 and process the captured audio, for example, using the audio processing module 1202 and data stores 1204 and/or 1206. The remote device 104 determines whether the captured audio corresponds to an utterance of a keyword and/or audible command that should be acted upon or executed. If so, the remote device 104 may execute the command, seek confirmation of for execution from the user device 102, send instructions to the user device 102, or perform other operations and functions. Such split configurations may be employed where the remote device 104 performs the processing of the audio and sends a verification or confirmation instruction based on the results of the processing.

Figure 13:
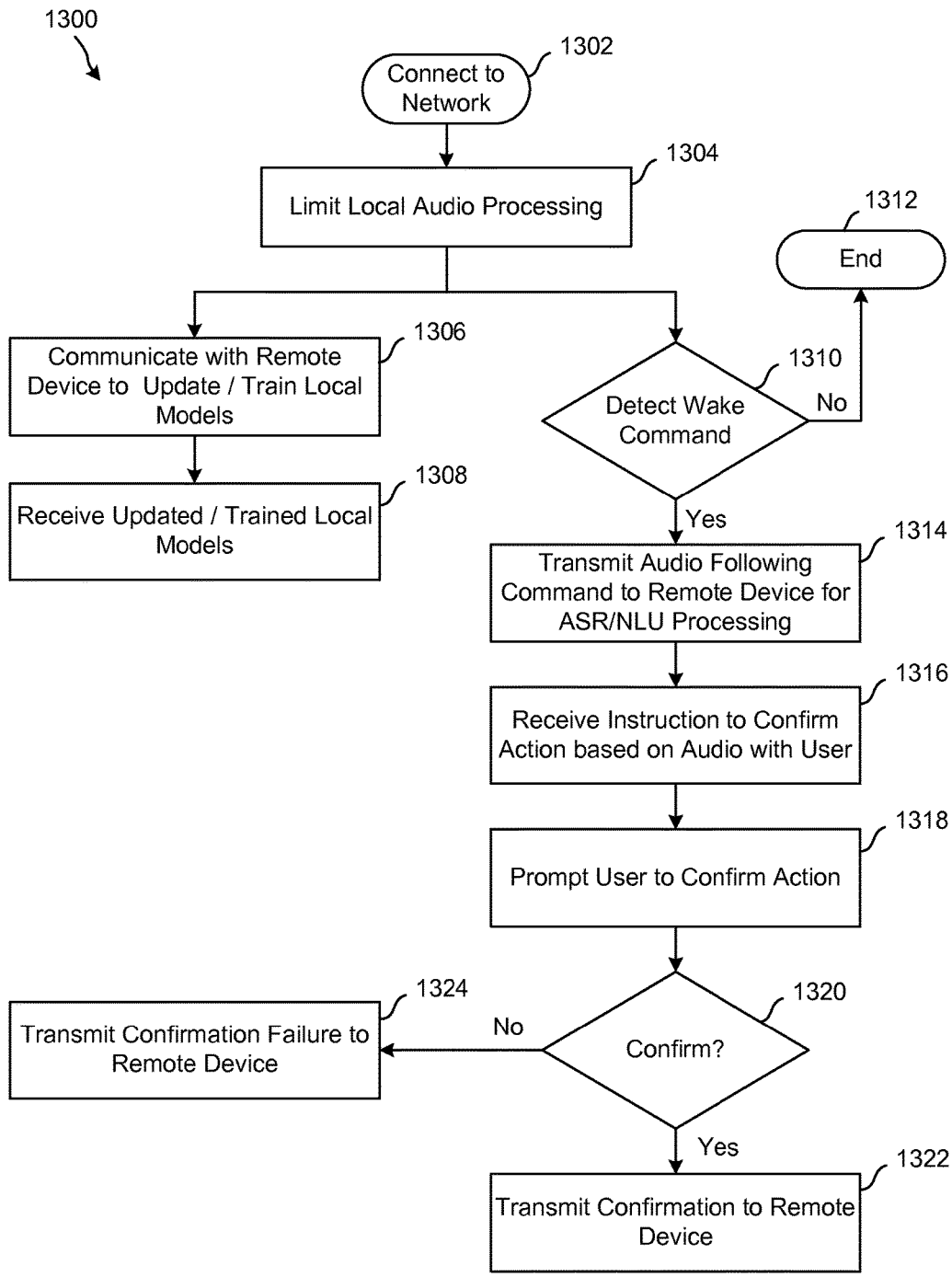
FIG. 13 illustrates an exemplary method of distributed processing according to embodiments of the present disclosure.

FIG. 13 illustrates an exemplary method 1300 of operation of the user device 102 in a distributed environment according to embodiments of the present disclosure. It should be appreciated that the method 1300 may be combined with the methods described with reference to FIGS. 1 and 3-10, and one or more steps of the methods may be incorporated into the other methods. Further, one or more of the components described above with reference to FIG. 2 may be used to perform the steps of the methods described herein.

As illustrated in block 1302, the user device has undergone the configuration process, for example, as described above, and connects to the network. The user device then limits a local audio processing mode of the user device, illustrated as block 1304. In an example, the user device may have stored all of the audio input from the user and the correct interpretations, for example, relating to the network ID and password. Now that the user device is connected to the network, the user device may send all of this stored audio data to the remote device for processing. The audio data and subsequent audio data received by the user device may be used by the remote device to train or update the speech models locally stored on the user device. Thus, the user device may communicate with the remote device to update and/or train the models locally stored on the user device, illustrated as block 1306. The user device may then receive the trained and/or updated models from the remote device, illustrated as block 1308. With the trained and/or updated models, a subsequent re-configuration of the user device (for example, when network connection fails) may be more accurate and more pleasing to the user.

The user device may also use the remote device for ASR/NLU processing and other operations using the network. In this respect, the user device may be in a remote ASR/NLU mode, in which the user device responds to a single keyword. In this respect, the user device may capture or receive audio input from a user. The user device may determine whether the captured audio includes a keyword, illustrated as block 1310. When the captured audio does not include a keyword, the user device may simply end further processing, illustrated as block 1312, and await for the keyword to be received.

When the captured audio includes the keyword, the user device may send the captured audio including the audio following the keyword to the remote device for ASR/NLU processing, illustrated as block 1314. The remote device may process the audio and identify any audible commands in the audio. The remote device may then perform and action, execute a command or operation corresponding to the audible command (such as, order laundry detergent for the user and have it shipped to the user), send an instruction to the user device to confirm the action to be taken (for example, please have the user confirm the user would like to order laundry detergent and have it shipped).

The user device may receive such an instruction to confirm the action to be taken with the user, illustrated as block 1316. The user device may then prompt the user for confirmation, illustrated as blocks 1318 and 1320. The user device may receive the user's response as an audio input, which may be confirmation or confirmation failure. At this stage the user device may send the audio (such as the confirmation, illustrated as block 1322, or confirmation failure, illustrated as block 1324) to the remote device for ASR/NLU processing.

Figure 14:
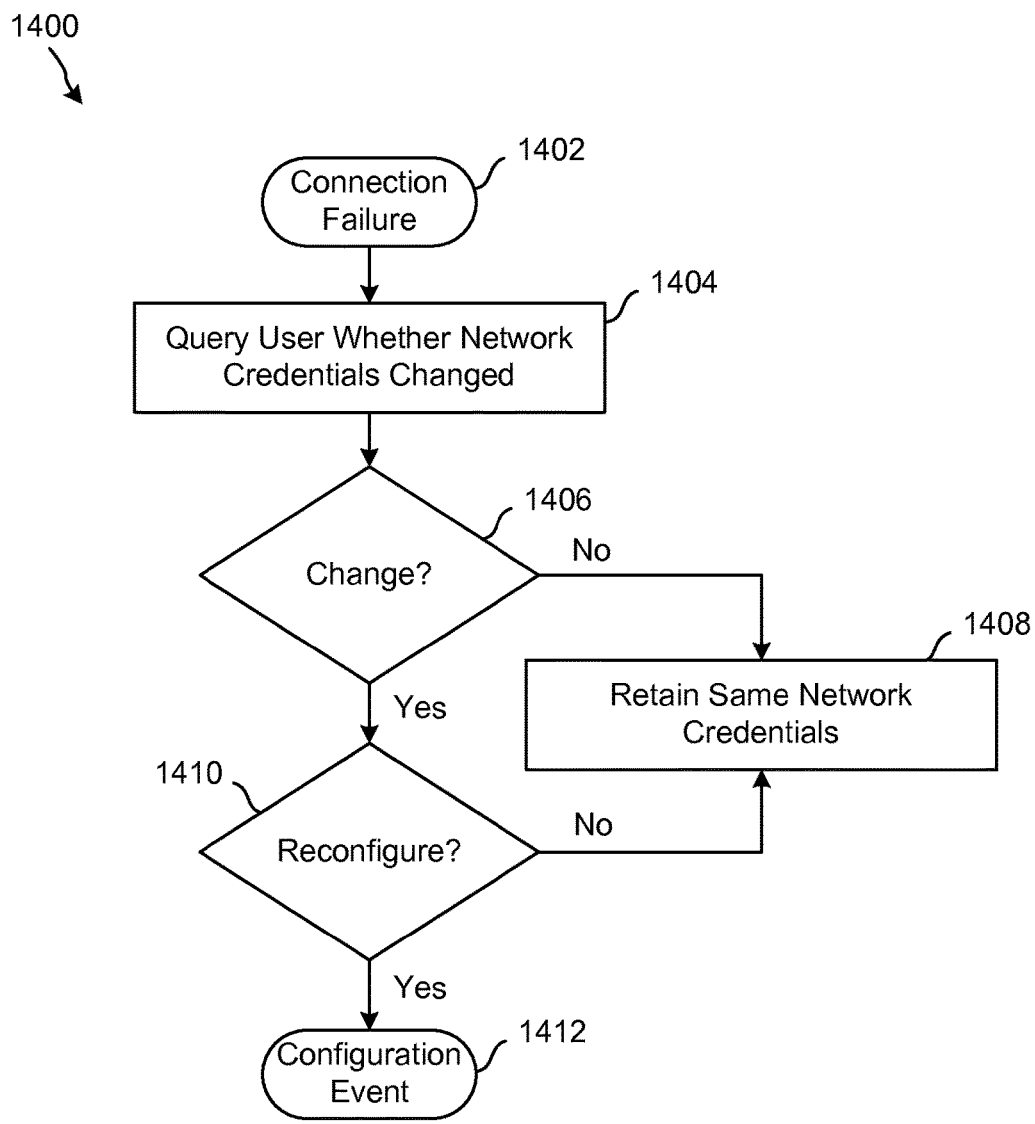
FIG. 14 illustrates an exemplary method of reconfiguring the user device using audible commands according to embodiments of the present disclosure.

When the user device is connected to and has access to the network, the user device may utilize the computing power of the remote device. On the other hand, when the user device experiences a network connection failure, the user device may enter the local audio processing mode and utilize the stored speech models (which may be the trained and/or updated models described above) and other information to enable to user to re-configure the network credentials, or perform other actions using the user device. FIG. 14 illustrates an exemplary method 1400 of re-configuring the user device when a network connection failure occurs according to embodiments of the present disclosure. It should be appreciated that the method 1400 may be combined with the methods described with reference to FIGS. 1, 3-10 and 13, and one or more steps of the methods may be incorporated into the other methods. Further, one or more of the components described above with reference to FIG. 2 may be used to perform the steps of the methods described herein.

As illustrated in block 1402, a network connection failure event occurs on the user device. In response to this event, the user device enters the local audio processing mode and queries the user to identify whether a change in network credentials has occurred, illustrated as block 1404. The user responds using an audible command and the user device receives audio input corresponding to the audible command. The user device processes the audio input and determine whether a change has occurred, illustrated as block 1406. When the network credentials have not changed, the user device retains the same network credentials, illustrated as block 1408. When the network credentials have changed, the user device may query the user to determine whether the user desires to update the network credentials, illustrated as block 1410. The user responds using an audible command and the user device receives audio input corresponding to the audible command. The user device processes the audio input and determines whether the user device should reconfigure, illustrated as block 1410. When the user device is not instructed to re-configure, the user device retains the same network credentials, illustrated as block 1408. When the user device is to re-configure, the user device may trigger a configuration event, illustrated as block 1412, and proceed in accordance with one or more of the methods described above to receive new network credentials.

The aspects of the present disclosure are meant to be illustrative. They were chosen to explain the principles and applications of the disclosure and are not intended to be exhaustive or to limit the disclosure. Many modifications and variations of the disclosed aspects may be apparent to those of skill in the art. Persons having ordinary skill in the field of computers and/or speech recognition should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Figure 15:
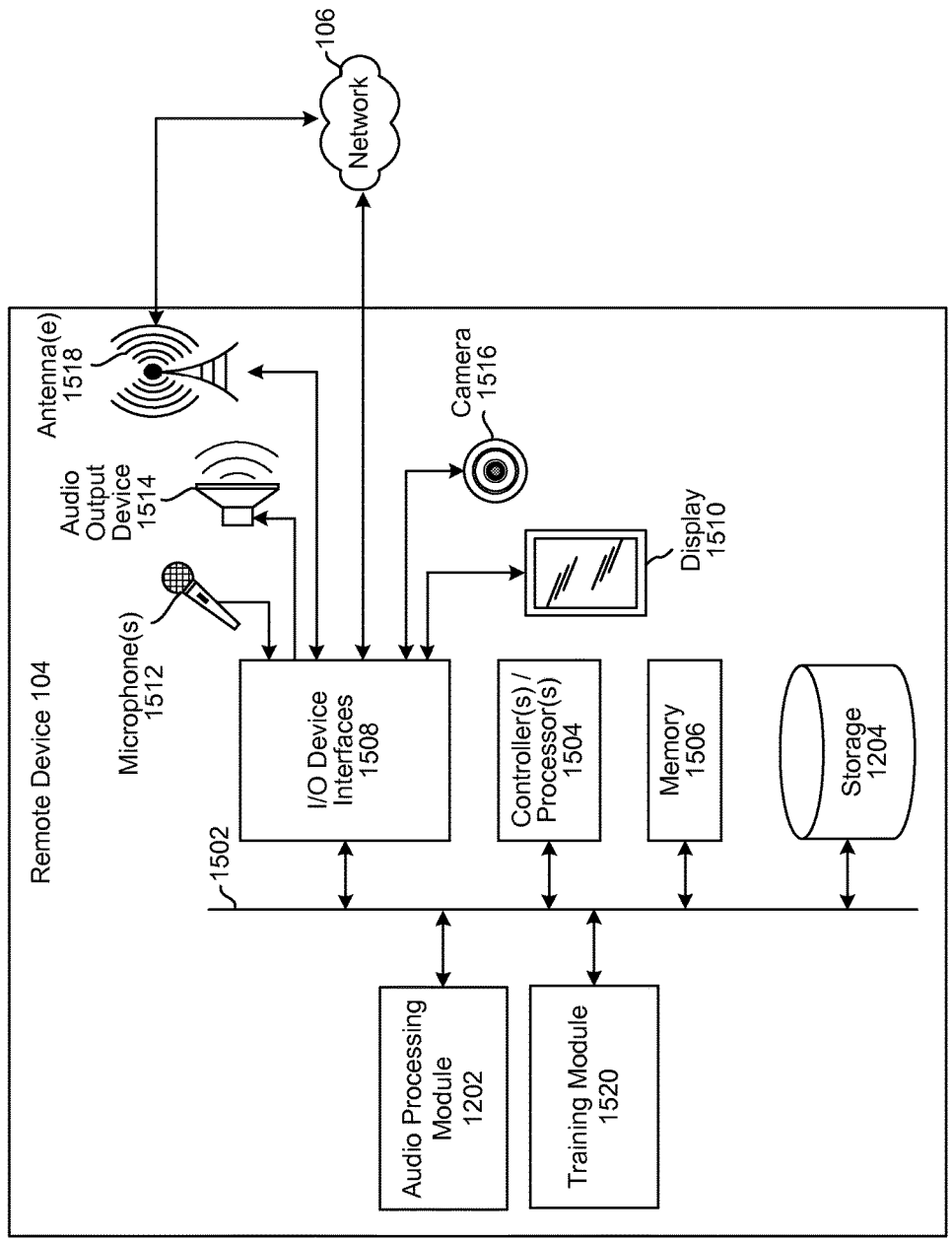
FIG. 15 is a block diagram conceptually illustrating an exemplary remote device according to embodiments of the present disclosure.

In an example, FIG. 15 is a block diagram conceptually illustrating example components of the remote device 104. In operation, the remote device 104 may include computer-readable and computer-executable instructions that reside on the remote device 104, as will be discussed further below.

The remote device 104 may include an address/data bus 1502 for conveying data among components of the remote device 104. Each component within the remote device 104 may also be directly connected to other components in addition to (or instead of) being connected to other components across the bus 1502.

The remote device 104 may include one or more controllers/processors 1504 that may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The remote device 104 may also include a data storage component 1204, for storing data and controller/processor-executable instructions (e.g., instructions to perform the algorithms and methods illustrated in and described above). The data storage component 1204 may include one or more non-volatile storage types such as magnetic storage, optical storage, solid-state storage, etc. The remote device 104 may also be connected to removable or external non-volatile memory and/or storage (such as a removable memory card, memory key drive, networked storage, etc.) through input/output device interfaces 1508.

Computer instructions for operating the remote device 104 and its various components may be executed by the controller(s)/processor(s) 1508, using the memory 1506 as temporary "working" storage at runtime. The computer instructions may be stored in a non-transitory manner in non-volatile memory 1506, storage 1204, or an external device. Alternatively, some or all of the executable instructions may be embedded in hardware or firmware in addition to or instead of software.

The remote device 104 includes input/output device interfaces 1508. A variety of components may be connected through the input/output device interfaces 1508, such as a display 1510, one or more audio capture device(s) (such as a microphone or an array of microphones 1512), an audio output device for producing sound (such as speaker(s) 1514), a camera 1516, and/or other such components. The input/output device interfaces 1508 may also include an interface for an external peripheral device connection such as universal serial bus (USB), FireWire, Thunderbolt or other connection protocol. The input/output device interfaces 1508 may also include a connection to one or more networks 106 via an antennae 1518, Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The display 1510 may be a display of any suitable technology, such as a liquid crystal display, an organic light emitting diode display, electronic paper, an electrochromic display, a cathode ray tube display, a pico projector or other suitable component(s). The camera 1516 and the display 1510 may be integrated into the remote device 104 or may be separate.

The remote device 104 further includes an audio processing module 1202 and a training module 1520. The audio processing module 1202 receives the captured audio of detected keywords and audible commands and any additional audio captured in the recording from the user device, and processes the audio to determine whether the recording corresponds to an utterance of the keywords and/or audible command that should be acted upon. The storage 1204 may store data (for example, audio fingerprints, comparison audio or other data) relating to utterances of keywords and commands from users. Although illustrated as incorporated within the remote device 104, the storage 1204 may be located separately and accessed by the remote device 104 (for example, over network 106).

The audio processing module 1202 may access the storage 1204 and compare the audio received from the user device to the stored utterances and audio sequences using audio comparison techniques. To process the received audio, the audio processing module 1202 may employ audio fingerprinting techniques and other speech/audio comparison techniques, including ASR techniques. For example, the audio processing module 1202 may use audio or acoustic fingerprinting techniques.

In an embodiment the audio processing module 1202 may include speech recognition capabilities to convert audio to text. The remote device 104 may compare text resulting from the received audio to stored text of known utterances and commands, etc. The audio processing module 1202 may be capable of more advanced ASR/NLU processing. For example, the audio processing module 1202 may use Hidden Markov Models (HMMs), Gaussian mixture models, and/or large vocabulary continuous speech recognition (LVCSR) based on HMMs and Gaussian mixture models.

In general, HMMs are used to determine probabilities that feature vectors may match phonemes. Using HMMs, a number of states are presented, in which the states together represent a potential phoneme and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed, the state may change or stay the same, based on the processing of the new feature vectors. A Viterbi algorithm may be used to find the most likely sequence of states based on the processed feature vectors.

The training module 1502 may be used to train the speech models described above. For example, the training module 1502 may train the models based on received audio data of the user, prior audio data of the user associated with the user's profile, and/or other data to increase the accuracy of the speech models in processing audio of the user. In an aspect, the training module 1502 may train the locally stored models on the user device using audio of the user sent to the remote device 104 by the user device 102. The remote device 104 may then send the locally stored models back to the user device 102 for use in any subsequent configuration of the user device 102.

The remote device 104 may include all or a subset of the components described above. Through the network 106, the remote device 104 may communicate with the user device 102 in a networked environment. The components of the remote device 104 as illustrated in FIG. 15 is exemplary, and may be a stand-alone device or may be included, in whole or in part, as a component of a larger device or system.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more components of the user device 102 or remote device 104 may be implemented as firmware or as a state machine in hardware. For example, at least the audio processing modules 222/1202 may be implemented as an application specific integrated circuit (ASIC), a digital signal processor (DSP), a field programmable gate array (FPGA), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A method for provisioning network credentials onto a device, comprising:

detecting pressing of a configuration button on the device, wherein the device lacks a visual display;

determining, in response to detecting the pressing of the configuration button, a plurality of wireless networks within range of the device;

outputting first audio indicating an identifier of a first wireless network included in the plurality of wireless networks;

outputting a prompt to select one of the plurality of wireless networks;

receiving second audio corresponding to a selection of the first wireless network;

processing, by the device, the second audio to determine security protocols associated with the first wireless network;

outputting third audio requesting spelling of a password corresponding to the first wireless network;

receiving fourth audio corresponding to an alphanumeric character included in the password;

processing, by the device, the fourth audio using a plurality of keyword models to obtain text corresponding to the alphanumeric character;

connecting, by the device, to the first wireless network using the password; and limiting processing of audio data by the device when the device is connected to the first wireless network and in communication with a remote device configured to perform speech recognition.

2. The method of claim 1, wherein receiving the fourth audio corresponding to the alphanumeric character included in the password and processing the fourth audio to obtain the text comprises:
   receiving a first audio segment corresponding to a first alphanumeric character included in the password;
   processing, by the device, the first audio segment using at least one of the plurality of keyword models to obtain first text corresponding to the first alphanumeric character;
   receiving a second audio segment corresponding to a second alphanumeric character included in the password; and
   processing, by the device, the second audio segment using at least one of the plurality of keyword models to obtain second text corresponding to the second alphanumeric character.

3. The method of claim 1, wherein outputting the first audio and outputting the prompt to select one of the plurality of wireless networks comprises:
   outputting a plurality of identifiers corresponding to the plurality of wireless networks; and
   outputting a prompt to request identification of which of the plurality of identifiers corresponds to the network of the user.

4. A method, comprising:
   receiving, by a device, a configuration request determining, by the device and in response receiving the configuration request, one or more wireless networks;
   outputting, by the device, a prompt for an audible input of a password for the device to access a first network of the one or more wireless networks;
   receiving, by the device, the audible input of the password;
   processing, by the device, the audible input using at least one of a plurality of keyword models to obtain text corresponding to the password; and
   in response to receiving the audible input at the device, connecting the device to the first network using the password.

5. The method of claim 4, wherein connecting to the first network using the password comprises:
   attempting to connect to each of the one or more wireless networks using the password.

6. The method of claim 4, wherein connecting to the first network using the password comprises:
   ordering the one or more wireless networks based on signal strength; and
   attempting to connect to a network of the one or more wireless networks having a highest signal strength using the password.

7. The method of claim 4, wherein receiving the audible input and processing the audible input comprises:
   receiving a first audio segment corresponding to a first character of the password;
   processing, by the device, the first audio segment using at least one of the plurality of keyword models to obtain a first text character corresponding to the first character;
   receiving a second audio segment corresponding to a second character of the password; and
   processing, by the device, the second audio segment using at least one of the plurality of keyword models to obtain a second text character corresponding to the second character.

8. The method of claim 7, further comprising:
   outputting, by the device, separate audio repeating each text character along with a word beginning with each text character.

9. The method of claim 4, wherein processing the audible input includes generating a matrix of potential text matches corresponding to the audible input; and
   wherein connecting to the first network using the password includes attempting to connect to the first network using each potential text match.

10. The method of claim 4, further comprising:
    outputting, by the device, third audio of a prompt to identify the first network;
    receiving, by the device, fourth audio corresponding to an identification of the first network; and
    processing, by the device, the fourth audio to determine the identification of the first network.

11. The method of claim 10, wherein outputting the third audio comprises:
    outputting a numbered list of the one or more wireless networks; and
    prompting selection of a number from the list.

12. The method of claim 4, further comprising:
    limiting processing of audio data by the device in response to a successful connection to the first network;
    detecting third audio corresponding to a command; and
    sending the third audio to a remote device for processing.

13. A device lacking a display, the device comprising:
    at least one processor; and
    a memory device including instructions operable to be executed by the at least one processor to perform a set of actions, configuring the at least one processor to:
    receive, by the device, a configuration request;
    determine, using the device, one or more wireless networks;
    output, by the device, a prompt for an audible input of a password for the device to access a first network of the one or more wireless networks;
    receive, by the device, the audible input of the password;
    process the audible input using at least one of a plurality of keyword models to obtain text corresponding to the password; and
    in response to receiving the audible input at the device, connect the device to the first network using the password.

14. The device of claim 13, wherein the at least one processor is further configured to connect to the first network using the password by attempting to connect to each of the one or more wireless networks using the password.

15. The device of claim 13, wherein the at least one processor is further configured to connect to the first network by:
    ordering the one or more wireless networks based on signal strength; and
    attempting to connect to a network of the one or more wireless networks having a highest signal strength using the password.

16. The device of claim 13, wherein the at least one processor is further configured to receive the audible input and processing the audible input by:
    receiving a first audio segment corresponding to a first character of the password;

processing, by the device, the first audio segment using at least one of the plurality of keyword models to obtain a first text character corresponding to the first character;

receiving a second audio segment corresponding to a second character of the password; and processing, by the device, the second audio segment using at least one of the plurality of keyword models to obtain a second text character corresponding to the second character.

17. The device of claim 16, wherein the at least one processor is further configured to:

output separate audio repeating each text character along with a word beginning with each text character.

18. The device of claim 13, wherein the at least one processor is further configured to:

process the audible input by generating a matrix of potential text matches corresponding to the audible input; and connect to the first network using the password by attempting to connect to the first network using each potential text match.

19. The device of claim 13, wherein the at least one processor is configured to:

output third audio of a prompt to identify the first network;

receive fourth audio corresponding to an identification of the first network; and process the fourth audio to determine the identification of the first network.

20. The device of claim 13, wherein the at least one processor is further configured to:

limit processing of audio data by the device in response to a successful connection to the first network;

detect third audio corresponding to a command; and send the third audio to a remote device for processing.

* * * * *